358-135. XR 3,795,763 EX

United States Patent [19]

Golding et al.

[11] 3,795,763

[45] Mar. 5, 1974

[54] DIGITAL TELEVISION TRANSMISSION SYSTEM

[75] Inventors: Leonard S. Golding, Rockville; Ronald K. Garlow, Damascus; Marvin D. Ginsberg, Baltimore; Wilfred G. Maillet, Oxon Hill, all of Md.; Pradman P. Kaul, Wshington, D.C.; Melville L. Heiges, Jr., Rockville, Md.; Bruce J. Merrihew, District Heights, Md.; Henry F. Mueller, Wheaton, Md.

[73] Assignee: Communications Satellite Corporation, Washington, D.C.

[22] Filed: Apr. 18, 1972

[21] Appl. No.: 245,129

[52] U.S. Cl. .......... 178/5.6, 178/5.2 R, 178/DIG. 3, 178/69.5 TV

[51] Int. Cl. .......................... H04n 7/12, H04n 9/02

[58] Field of Search ............ 178/5.2 R, 6.8, DIG. 3, 178/DIG. 22, DIG. 23, 7.1, 7.2, 5.4 R; 179/15 BW, 155 ST, 2 TV; 325/38 B

[56] References Cited

UNITED STATES PATENTS

| | | | |
|---|---|---|---|
| 2,963,551 | 12/1960 | Schreiber et al. | 178/DIG. 3 |
| 3,707,680 | 12/1972 | Gabbard et al. | 325/38 B |

OTHER PUBLICATIONS

Golding, "A 15 to 25 MHz Digital Television System for the Transmission of Commercial Color Television," December 19, 1967, available from the U.S. Dept. of Commerce Clearing House for Federal Scientific and Technical Information as publication PB 178993.

*Primary Examiner*—Robert L. Richardson
*Attorney, Agent, or Firm*—Sughrue, Rothwell, Mion, Zinn & Macpeak

[57] ABSTRACT

A digital television transmission system for transmitting television signals at substantially reduced bit rate and bandwidth. Frequency interleaving techniques reduce the sampling rate,and digital differential PCM with edge recoding techniques reduce the number of bits per sample. Further, reduction in bit rate is accomplished by eliminating approximately half the chrominance data and all the sync pulses from the transmitted signal. Periodic sync words are transmitted to allow reconstruction of the sync pulse format at the receiver. All transmitted bits are multiplexed in accordance with a particular format which provides proper alignment of the luminance and chrominance lines at the receiver.

6 Claims, 16 Drawing Figures

DIGITAL TELEVISION TRANSMISSION SYSTEM

BACKGROUND OF THE INVENTION

In a conventional digital television transmission system the composite color television signal would be sampled at a 10MHz rate and quantized to eight bits per sample resulting in a data rate of 80 M bits per second. If, a 4-phase PSK modem is used an r-f bandwidth of 40 MHz is required. This is the same bandwidth required in an analog television transmission system using an FM modem. In satellite communications systems major emphasis is placed on reducing the required r-f bandwidth needed for high quality transmission. One of the primary advantages of a digital transmission system is the ability to employ bandwidth compression techniques which cannot be used in an analog system.

The most relevant prior art known is a generalized proposal for the study of a digital television transmission system using bandwidth compression techniques. The proposal appears in a technical memorandum prepared by the assignee herein under the direction of Dr. Golding, one of the inventors herein. The technical memorandum is entitled, "A 15 to 25 MHz Digital Television System For Transmission of Commercial Color Television," CL-8-67, Dec. 19, 1967, and is available from the Clearinghouse for Federal Scientific and Technical Information as publication PB 178993. The latter article represents a beginning of the research effort culminating in the embodiment described in this application and contains a number of suggestions for bandwidth reduction techniques some of which were carried forth to a workable embodiment by the research effort mentioned above.

SUMMARY OF THE INVENTION

In accordance with the subject invention a digital television transmission system is disclosed in which the bit rate for a single television channel is reduced to approximately 30 Megabits/second. The liminance and both chrominance components are separated from one another and sampled at less than their respective Nyquist rates. The samples are quantized and then converted into difference samples having further bit reduction per sample. The audio is sampled at the horizontal line rate and the digital representations of the video channels and audio are serially multiplexed into an output bit stream. Every other pair of lines of chrominance is completely eliminated from the multiplexed serial bit stream but is reconstructed at the receiver from adjacent chrominance lines which are included within the multiplexed bit stream. The vertical and horizontal sync pulses are also eliminated from the bit stream and are replaced by periodic sync words. However, sync words are not transmitted for every sync pulse. The sync words which are transmitted are sufficient to allow reconstruction of the vertical and horizontal sync pulses at the receiver. The multiplexing and chrominance/luminance alignment problems are solved by multiplexing and demultiplexing techniques which use a plurality of submemories for buffering the digital data.

DETAILED DESCRIPTION OF PREFERRED EMBODIMENT

A preferred embodiment of the invention will be described in connection with the transmission and reception of a standard NTSC color television signal. As is well known, the video portion of an NTSC color television signal includes a luminance component, Y, and two chrominance components, I and Q. The bandwidths for the Y, I and Q components are, respectively, 4.2 megahertz, 1.5 megahertz, and 0.5 megahertz. Also, as is well known, the luminance spectrum is not continuous but contains energy concentrated around the harmonics of the horizontal line rate, 15.73 kilohertz. The chrominance energy fills the gaps in the spectrum of the luminance signal. This is accomplished by modulating the chrominance signal on a sub-carrier which is at an odd multiple of half the line frequency. The sub-carrier is 3.58 megahertz.

Figure 1:
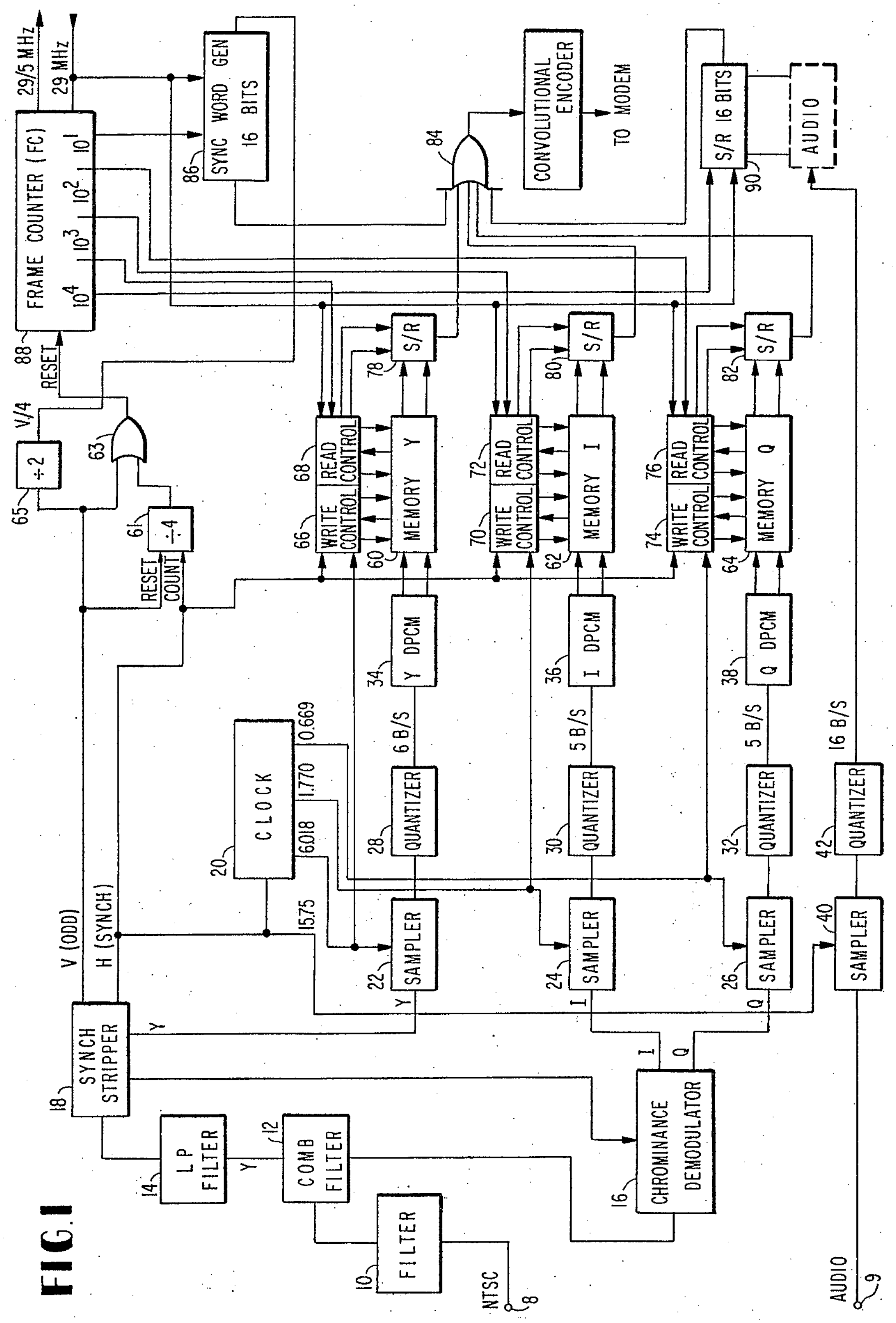
FIG. 1 is a general block diagram of the transmit side of the digital television transmission system.

Referring now to FIG. 1, the NTSC color T.V. signal and the audio are received at terminals 8 and 9 respectively. These signals are sent to the transmission station of FIG. 1 by a subscriber, e.g., T.V. broadcast company. The signals are processed at the transmission station and transmitted via a satellite to one or more receiver stations. The audio signal is applied to sample circuit 40 which operates to provide pulse samples of the audio signal at a sample rate of 15.75 kilohertz. Each sample is then quantized in a quantizer means 42, which may be of any conventional type, to provide a 16 bit binary word per sample. As will be apparent to any one of ordinary skill in the art, the rate at which the audio is sampled is greater than the Nyquist rate and therefore is more than sufficient to provide the necessary quality for the reconstructed audio signal at the receiver. However, it is convenient in the multiplexing apparatus to be described later to have the audio sampled at the horizontal line rate rather than at the lower audio Nyquist rate. The use of a higher sampling rate for the audio may seem contra to the intended purpose of reducing the overall bandwidth, but in general the audio occupies such a small portion of the bandwidth that doubling or tripling, etc., the sampling rate of the audio and increasing the number bits per sample is insignificant from an overall bandwidth saving viewpoint.

A frequency interleaving technique is used on the video portion of the signal at terminal 8. Details of this technique are found in U.S. Pat. application number 105,386 entitled, "Reduced Rate Sampling Process in Pulse Code Modulation of Analog Signals," filed by Leonard S. Golding and Ronald K. Garlow on Jan. 11, 1971 and assigned to the assignee herein. As pointed out in the latter mentioned patent application, certain types of analog signals e.g., NTSC color signals, can be converted into digital representations thereof by sampling the Y, I and Q components at less than their respective Nyquist rates. An NTSC signal lends itself to frequency interleaved sampling at less than the Nyquist rate because each component has a frequency spectrum which is non-continuous and which includes concentrations of energy at harmonics of the horizontal line frequency. Thus, by sampling the Y, I and Q components at respective odd multiples of one-half the horizontal line frequency, the sampling error energy falls in the gaps between the energy concentration points of the desired signal and therefore can be filtered out without causing any significant degragation of the desired signal.

Referring back to FIG. 1, the video signal is applied to a comb filter 12 which separates the luminance component Y from the modulated I and Q components. The luminance component Y is passed through a low-pass filter 14 to a sync stripper 18. The sync stripper 18 provides the horizontal and vertical synch pulses at outputs thereof and provides the luminance component Y absent the sync pulses at another output thereof. The modulated I and Q components are applied to a chrominance demodulator 16 wherein they are demodulated and provided at respective I and Q outputs from the chrominance demodulator. Since the modulation frequency is a multiple of the horizontal line frequency, the demodulation signal may be derived in a conventional manner from the horizontal sync pulses. The demodulation frequency can be supplied from the sync stripper or from a clock means 20. The clock means 20 which receives the horizontal sync pulses from sync stripper 18 generates a plurality of output clocks which have frequencies that are multiples of and synchronized to the horizontal line frequency.

The Y component from sync stripper 18 is applied to sampler 22 and sampled at the rate of 6.018 megahertz. The latter rate is an odd multiple of one-half the horizontal line frequency, and is less than the Nyquist rate for the luminance component. The I component from chrominance demodulator 16 is applied to sampler 24 and sampled at the rate of 1.770 megahertz The latter rate is also equal to an odd multiple of one-half the horizontal line frequency and is less than the Nyquist rate for the I component. The Q component from the chrominance demodulator is applied to sampler 26 and sampled at the rate of 0.669 megahertz. The latter rate is also equal to an odd multiple of one-half the horizontal line frequency and is less than the Nyquist rate for the Q component. The samples from samplers 22, 24 and 26 are applied respectively to conventional quantizers 28, 30 and 32. As will be well understood by anyone of ordinary skill in the art, the quantizers 28, 30 and 32 may be conventional analog to digital converters. In the preferred embodiment, the Y samples are converted into 6 bits per sample, whereas the I and Q samples are converted into 4 bits per sample. A lower number of bits per sample for the I and Q signals is permissable because those signals have a smaller amplitude range and fewer quantization levels are necessary to provide accurate reproduction of the I and Q signals at the receiver.

At this point in the transmitter, the bit rates of the components have already been reduced relative to that which would occur using conventional sampling, due to the frequency interleaving technique of sampling. Obviously, for a given number of bits per sample, a lower sample rate results in a bit rate reduction. An even further bit rate reduction is provided by the use of digital differential DPCM apparatus with edge recoding. Briefly, a DPCM of the latter type receives successive digital samples and transmits a code representative of the difference between the digital samples. Furthermore, the entire range of difference levels is divided into a non-edge region and an edge region. The edge region represents those difference signals which will occur at the outline of figures in the T.V. picture. Normally, the amplitude difference between successive samples is very small and falls in the non-edge region, but when an edge is encountered, the amplitude difference between successive samples will be very large. In the DPCM of the type mentioned above, the same group of codes is used for the edge region and the non-edge region and means are provided for distinguishing between an edge difference level and a non-edge difference level. Additionally, bit rate reduction is further achieved in the DPCM of the type described by the use of disjoint intervals. That is, the identical output code may represent more than a single difference level, but due to the disjoint nature of the two difference levels represented by the same code, only one can be correct and the correct one is recognized at the receiver. For more detail on the DPCM using edge recording and disjoint intervals reference should be made to U.S. Pat. application number 214,271 entitled, "A Digital Differential Pulse Code Modem," by Kaul and Golding, filed Dec. 30, 1971 and assigned to the assignee herein. As shown in FIG. 1, the Y DPCM receives the 6 bit samples and provides 5 bit output words. The I and Q DPCM's receive 5 bit samples and provide 4 bit outputs.

Following the bit rate reduction in the respective DPCM devices, the Y, I and Q signals are buffered and, along with the audio and sync word, are multiplexed into a serial bit stream at the rate of 29 megabits per second. During the buffering and multiplexing the overall bit rate is further reduced by completely eliminating half of the I and Q lines. Tests show that this can be accomplished without any subjective deterioration of the picture quality.

The subjective quality of a television picture is best if the vertical and horizontal resolution is approximately the same. For any video signal the horizontal resolution is determined by the bandwidth. For example, considering the Y component the band width is 4.2 megahertz and the vertical and horizontal resolution is approximately the same. However, for the I and Q components the respective bandwidths are 1.5 megahertz and 0.5 megahertz. Consequently, the vertical resoltuion is much greater than the horizontal resolution. We can therefore reduce the vertical resolution of the chrominance signals without any real loss in picture quality. It is noted that in the SECAM system used in French television, every other line of I and Q is eliminated in the normal video analog signal transmitted. In the present system, unlike the SECAM system, instead of eliminating every other I an Q line, we eliminate every other pair of I and Q lines. Thus, the first and second I and Q lines are transmitted; the third and fourth I and Q lines are eliminated; the fifth and sixth are transmitted; the seventh and eighth I and Q lines are transmitted, etc. The reason why we eliminate alternate pairs is due to the particular frequency interleaving sampling technique mentioned above.

The eliminated line must be reconstructed at the receiver. Thus, if we transmitted lines 1 and 3, line 2 could be reconstructed from lines 1 and 3 by a point-by-point averaging technique. However, since the I and Q components are sampled at an odd multiple of one-half of the line frequency, the samples in adjacent lines will be askew. Thus, if one looks at I line number 1, and I line number 2, and particularly notes the position of the samples relative to the beginning of the respective lines, it can be seen that sample times in line 2 differs from the sample times in line 1. If the first sample of line $I_1$ is averaged with the first sample of line $I_3$ to reconstruct a first sample of line $I_2$, the reconstructed sample will not be at the correct position of line $I_2$ relative to the start of line $I_2$. This problem is solved by transmitting alternate pairs of the I and Q lines. At the receiver $I_3$ is reconstructed by averaging the samples from $I_1$ and $I_5$. This is possible because lines 1, 3, 5, 7 etc., will have their respective samples aligned. Also, $I_4$ which is the second I line eliminated, can be reconstructed from the samples of $I_2$ and $I_6$. The actual reconstruction will be described in more detail in connection with a description of the receiver portion of the digital television system described herein. For the present, it is sufficient to understand that every other pair of I and Q lines are eliminated from the transmitted bit stream.

Figure 2:
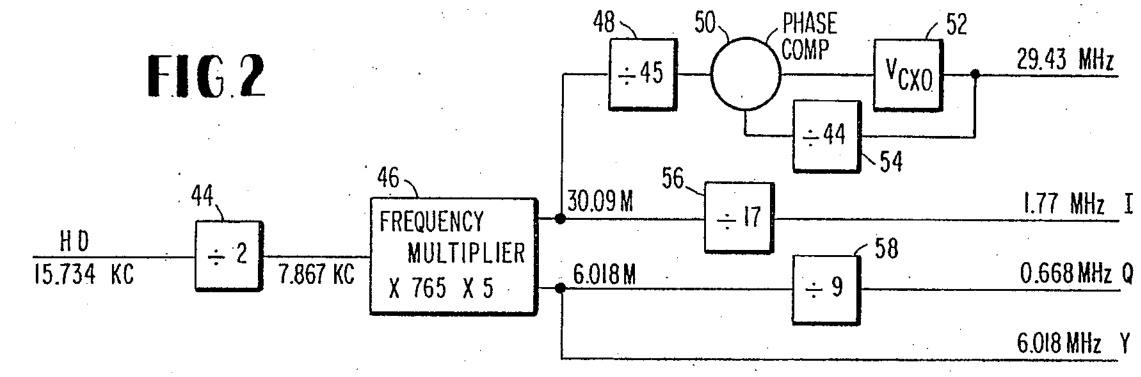
FIG. 2 is a block diagram of the clock source shown in FIG. 1.

Before describing the buffering and multiplexing apparatus, reference is made to FIG. 2 which shows an example of the clock system 20 for generating various clock frequencies used in the transmitter apparatus. As shown there, the horizontal sync pulses which occur at the rate of 15.734 kilohertz are divided by 2 in divider 44 resulting in a 7.867 kilohertz clock signal. The latter pulses are multiplied by appropriate amounts in frequency multiplier 46 resulting in a pair of pulse streams at the respective clock rates of 30.09 megahertz and 6.018 megahertz. The 6.018 megahertz clock controls the sampling of the Y component. The latter clock signal is also divided by 9 in divider 58 to provide a 0.668 megahertz clock for sampling the Q component. The 30.09 megahertz clock is divided by 17 in divider 56 to provide a 1.77 megahertz clock for sampling the I component. The 30.09 megahertz clock is also divided by 45 in a divider 48 and then applied to a phase-locked loop comprising phase comparative 50, voltage controlled oscillator 52, and divider 54, to provide a 29.43 megahertz clock. The latter clock signal controls the read out from the buffer memories, the sync word generator, and the audio register, as will be described more fully hereafter.

Referring back to FIG. 1, the buffering and multiplexing apparatus comprises Y memory 60, I memory 62, Q memory 64, each having respective write control and read control circuits, serial to parallel shift registers 78, 80 and 82, associated respectively with three memories, a sync word generator 86, an audio shift register 90, a frame counter 88, and an OR circuit 84. The outputs from the respective DPCM's are written into the memories 60, 62 and 64 respectively, as received, under control of write control means 66, 70 and 74. The frame counter 88 which counts the 29 megahertz clock pulses (actually 29.43 megahertz) controls the time at which data is read from the memories 60, 62 and 64, and the time at which the sync word is generated and the audio words are read out. All the data is applied to the OR circuit 84 resulting in the output serial bit stream. The timing signals from the frame counter are applied to read control circuits 68, 72 and 76 to control read out from the respective memories.

It should be noted that the term "frame" as used herein refers to a transmitted frame of information and not to a television frame, as that term is conventionally used. As is well known, a conventional television signal has 525 lines per frame and each frame is divided into two fields of interlaced lines. In the preferred embodiment described herein, a transmission frame has a duration equal to four horizontal lines of the video signal. During each transmission frame the following data, in digital form, is transmitted: one 16 bit sync word, four lines of Y data, four 16 bit audio words, two lines of I data and two lines of Q data.

The frame counter 88 counts the 29 MHz clock pulses and is reset by every fourth H pulse from the sync stripper 18. As illustrated, the H pulses are applied to a divide by four counter 61 whose output is applied via OR gate 63 to the reset input of frame counter 88. The resetting of the frame counter is also synchronized to the start of a television frame by applying every other V sync pulse (designated V (odd)) to the reset inputs of counters 61 and 88. After the initial resetting of counter 61 every V (odd) pulse will be in coincidence with an output pulse from counter 61. Conventional decoding means, which may be a part of the frame counter and which is not shown in detail, is provided to decode desired count conditions of the frame counter to provide output pulses to trigger certain events at the desired times of each transmission frame.

In the specific embodiment described herein, the Y buffer memory 60 comprises 20 Y submemories labelled $Y_{01}$ through $Y_{20}$, respectively. Each of the submemories $Y_{05}$, $Y_{10}$, $Y_{15}$, and $Y_{20}$ has a capacity for storing 62 five-bit words. Each of the other Y submemories has a capacitry for storing 64 five-bit words. The storage capacity is such that a full horizontal line of Y data can be stored in submemories $Y_{01}$ through $Y_{05}$, another full line can be stored in submemories $Y_{06}$ through $Y_{10}$, another full line can be stored in submemories $Y_{11}$ through $Y_{15}$, and still another full line can be stored in $Y_{16}$ through $Y_{20}$. It will be noted that the double digit subscript is used herein to designate a submemory whereas a single digit subscript is used to designate a line number. For example, $Y_{02}$ designates the second Y submemory whereas $Y_2$ designates the second line of luminance information.

The I memory 62 comprises two I sub-memories, $I_{01}$ and $I_{02}$ respectively, each having the capacity for storing 47 four-bit words and having the combined capacity for storing one line of I data. The Q memory 64 comprises two Q submemories, $Q_{01}$ and $Q_{02}$ respectively, each having the capacity for storing 18 four-bit words and having the combined capacity for storing one line of Q data.

Figure 3:
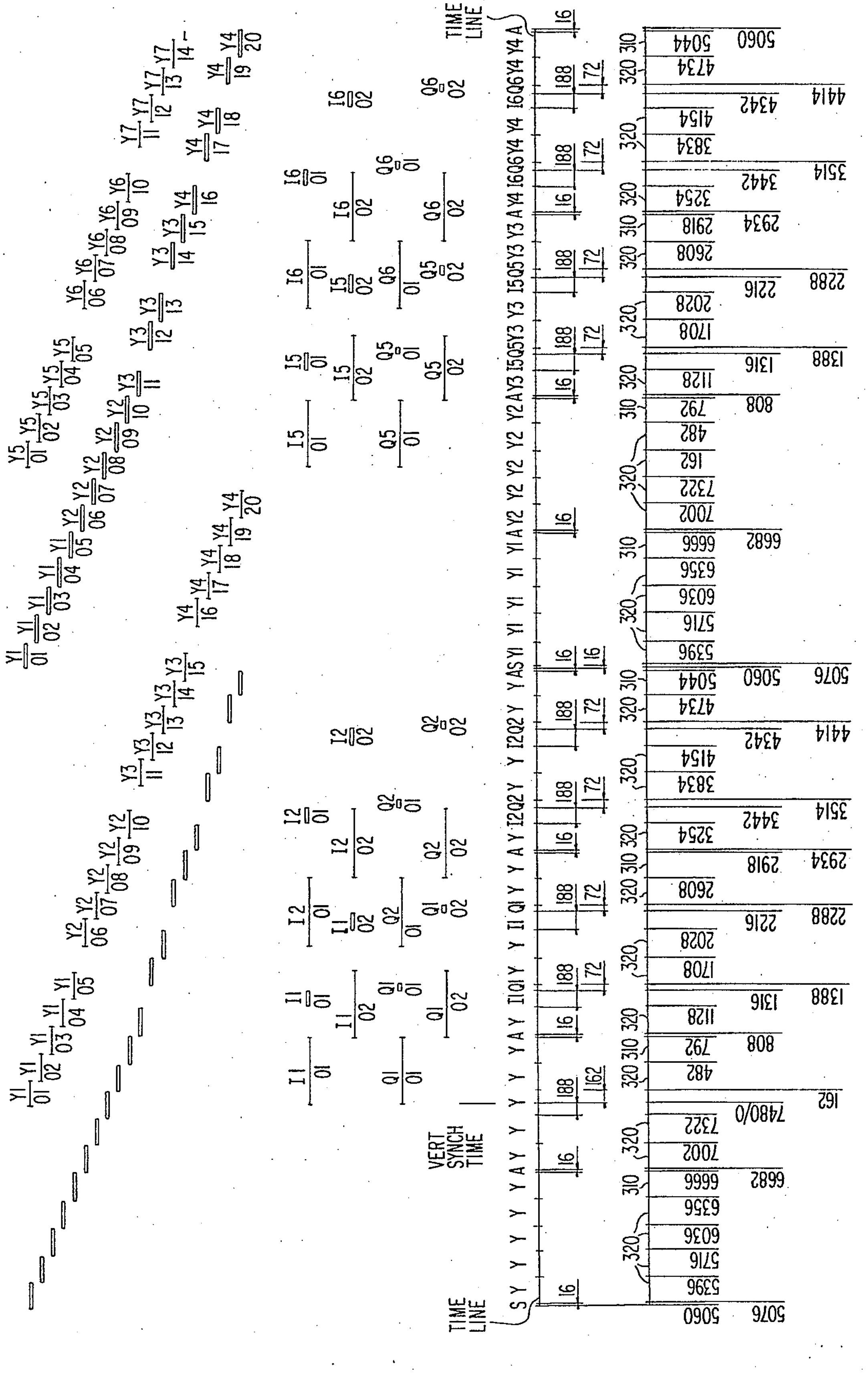
FIG. 3 is a timing diagram illustrating the write and read times for the transmitter submemories.

The format for a single frame of the multiplexed data, which is the same as the readout format from the three memories, the sync word generator and the audio shift register, is shown in FIG. 3. In FIG. 3, the symbol S represents the 16-bit sync word and the symbol A represents the 16-bit audio word. The four digit numbers adjacent the time line in the middle of the drawing represent the times of the frame counter at which the symbolized data is read out. In the figure above the time line the horizontal lines represent write times into the respective submemories, and the elongated rectangles represent the read times from the respective memories. As an example of how the drawing can be read, consider the following. On the left portion of the drawing there appear lines and rectangles representing the I lines and rectangles. There are two $I_1$ lines or bars both labelled $I_1$. The $I_1$ symbol represents the first line of I data in the T.V. frame. The $I_1$ line is shown in two bars because the I submemories each hold only a half line of I data. Below the first bar labelled I is the number 01. That number refers to $I_{01}$ submemory. Looking down from the start of the $I_1$ bar it can be seen that at time 0000 on the frame counter, the first half of line $I_1$ is written into $I_{01}$. Also at time 0792 of the frame counter the first half of $I_1$ has been completely written into $I_{01}$ and the second half of $I_1$ begins being written in $I_{02}$. Also, during the writing into $I_{02}$, the contents of $I_{01}$ are read out between times 1128 and 1316. This is shown by the $I_1$ rectangle with 01 below it. This is also seen on the time scale at the bottom of the drawing.

The relative time relation between the read and write times of the Y and I lines (Q not shown because it is identical to I) is illustrated in Table I below.

| VIDEO LINE | Y WRITE | Y READ | I WRITE | I READ |
|---|---|---|---|---|
| 1 | 1 | | 1 | |
| 2 | 2 | | 2 | |
| 3 | 3 | | | 1 |
| 4 | 4 | | | 2 |
| 5 | 5 | 1 | 5 | |
| 6 | 6 | 2 | 6 | |
| 7 | 7 | 3 | | 5 |
| 8 | 8 | 4 | | 6 |
| 9 | 9 | 5 | 9 | |
| 10 | 10 | 6 | 10 | |
| 11 | 11 | 7 | | 9 |
| 12 | 12 | 8 | | 10 |
| 13 | 13 | 9 | 13 | |
| 14 | 14 | 10 | 14 | |
| 15 | 15 | 11 | | 13 |
| 16 | 16 | 12 | | 14 |
| 17 | 17 | 13 | 17 | |
| 18 | 18 | 14 | 18 | |
| 19 | 19 | 15 | | 17 |
| 20 | 20 | 16 | | 18 |
| 21 | 21 | 17 | 21 | |
| 22 | 22 | 18 | 22 | |
| 23 | 23 | 19 | | 21 |
| 24 | | 20 | | 22 |
| 25 | | 21 | 25 | |
| 26 | | 22 | 26 | |
| 27 | | 23 | | 25 |
| 28 | | 24 | | 26 |

As can be seen from the above table and in more detail in FIG. 3 all Y lines and every other pair of I lines are written into their respective memories as they are received from the DPCM devices. However, in the read out sequence the Y lines are delayed relative to the I and Q lines, e.g., $Y_3$ and $I_5$ are read out during approximately the same period. This relative delay is necessary because every other pair of I and Q lines are completely absent from the transmitted data. The relative delay allows the missing lines to be reconstructed at the proper relative times in the receiver. The reconstruction and the write/read sequence will be described more fully in connection with the description of the receiver portion of the invention.

Referring to the time scale in FIG. 3, it can be seen that every transmission frame begins at time 5060 of the frame counter and the first block of data in each transmitted frame is a 16-bit sync word. Referring to FIG. 1 the sync word generator 86 is shown as receiving a time control input from the frame counter 88 and the 29 MHz read out clock pulses. The time control input occurs at time 5060 of the frame counter. For proper T.V. frame and field synchronization at the receiver it is also necessary to transmit a vertical sync word periodically. The technique used herein is to substitute a vertical sync word for the normal sync word once every two T.V. frames. The V (odd) sync pulse is applied to a divide by two counter 65 whose output is applied to the generator 86. The next sync word generated following receipt of a pulse from the counter 65 is the complement of the normal sync word and represents vertical sync. As will be apparent, separate generators could be used instead of one as shown in the drawing. Also, the time of transmission will be the same whether the normal sync word or the vertical sync word is transmitted.

Figure 4:
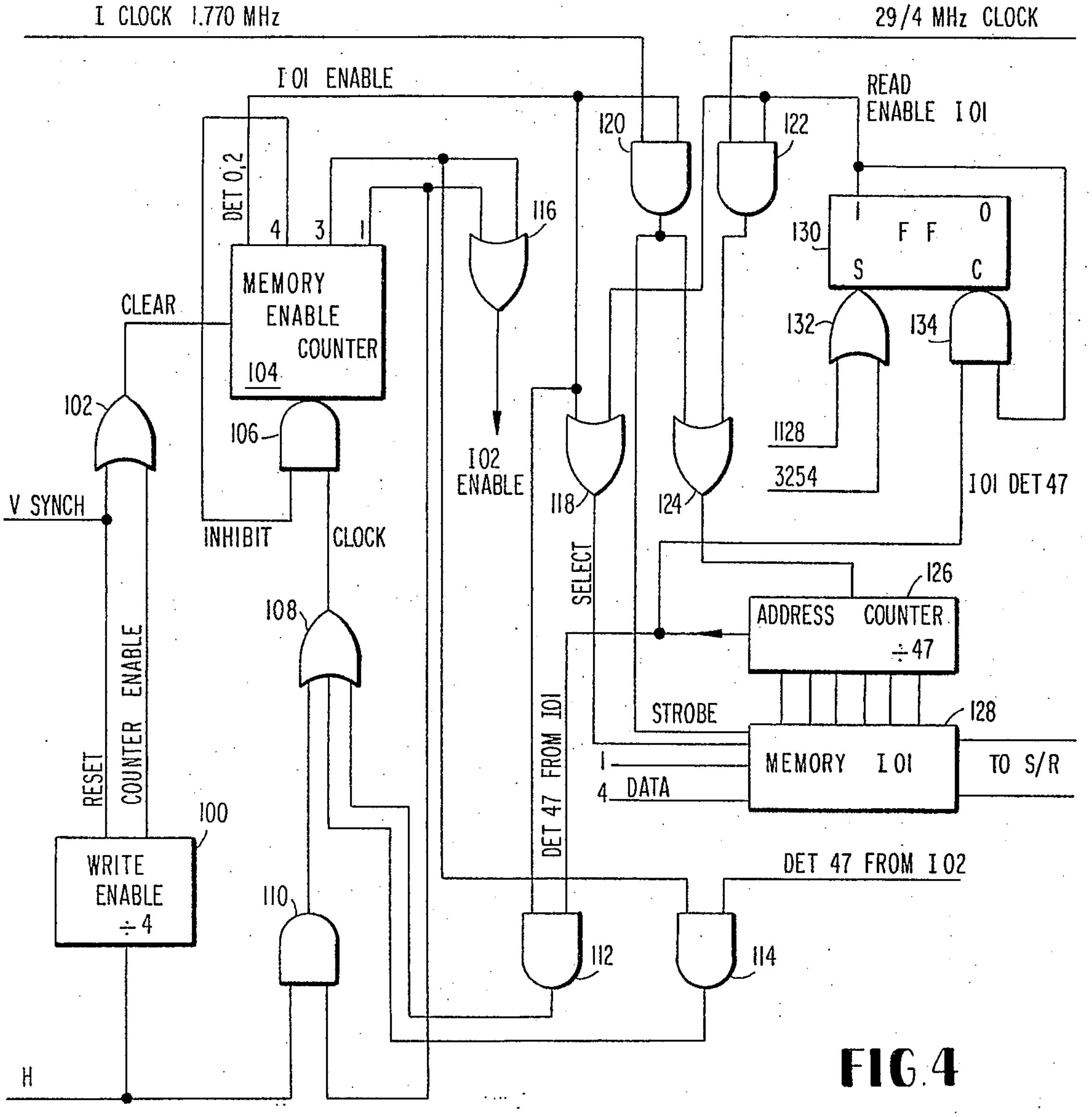
FIG. 4 is a block diagram illustrating the write and read operation of the Y submemories in the transmitter.

The I memory and related write control and read control circuitry is illustrated in greater detail in FIG. 4. For simplicity, only the $I_{01}$ submemory 128 is illustrated. The $I_{02}$ submemory is identical and the control circuitry is also identical. The write operation will be described first. A memory enable counter 104 is cleared to a count of zero by the application of the vertical sync pulse through an OR gate 102. The vertical sync pulse also resets a write enable divide by four counter 100. When the memory enable counter 104 is at a count of zero an $I_{01}$ ENABLE logic signal will be generated and will be applied via OR gate 118 to the select input of memory $I_{01}$. Thus, memory $I_{01}$ will be selected for operation. The $I_{01}$ ENABLE logic signal also closes AND gate 120 to thereby pass strobe pulses at the clock rate of 1.77 megahertz to the $I_{01}$ submemory and to the address counter 126 which addresses the $I_{01}$ submemory. The strobe pulses are applied to the address counter 126 via OR gate 124. As will be recalled, the I clock rate of 1.770 megahertz is the rate at which the I component was sampled and, therefore, it is the rate at which the four bit I words are applied to the submemories $I_{01}$ and $I_{02}$ from the I DPCM. The strobe pulses step the address counter at the afore mentioned rate cuasing the address counter 126 to count from 1 to 47. For each new count of the address counter 126, a new four-bit data word from the I DPCM is inserted into the addressed location of memory $I_{01}$.

Preceeding the first line of I data from the DPCM, the first horizontal sync pulse will be applied to the write enable counter 100 and also to one input of AND gate 110. However, the other input of AND gate 110 will be at a logic zero and therefore the pulse will not pass through AND gate 110. When address counter 126 reaches a count of 47, this is detected and a logic one signal is applied to one input of AND gate 112. The other input is connected to the $I_{01}$ enable line and thus, a pulse output from 112 will pass through OR gate 108 and through the inhibit gate 106 to advance the memory enable counter to the count of one. When the memory enable counter 104 is at the count of one, the $I_{02}$ ENABLE logic signal will be generated via OR gate 116. The $I_{02}$ ENABLE logic signal will control writing into submemory $I_{02}$ in the same manner that the $I_{01}$ ENABLE logic signal controls writing into memory $I_{01}$. Thus, the second 47 four-bit words, corresponding to the second half of the first line will be written into submemory $I_{02}$. As will be explained more fully hereafter, during the time that the submemory $I_{02}$ is being written into, the data previously stored in memory $I_{01}$ will be read out. When submemory $I_{02}$ is filled, its corresponding address counter will provide an output signal labelled detect 47 from $I_{02}$ which will be applied to the AND gate 114. However, at that time the latter signal will not pass through AND gate 114 because the other input to AND gate 114 will be at a logic zero.

The next signal to occur is the second horizontal sync pulse which advances the write enable counter 100 to a count of two and which passes through AND gate 110, OR gate 108 and inhibit gate 106 to advance the memory enable counter 104 to a count of two. This generates the $I_{01}$ ENABLE logic signal which now controls the writing of the first half of the second I line into submemory $I_{01}$. When that is accomplished, the DETECT 47 logic signal from address counter 126 passes through AND gate 112, OR gate 108 and inhibit gate 106 to advance the memory enable counter to a count of three. The count of three in memory enable counter 104 generates the $I_{02}$ ENABLE pulse via OR gate 116 to control the writing of the second half of the second I line into submemory $I_{02}$. When the second half of the second line has been written into submemory $I_{02}$, a DETECT 47 from $I_{02}$ signal will be applied to AND gate 114 resulting in an output pulse therefrom which is applied through OR gate 108 and inhibit gate 106 to advance the memory enable counter 104 to a count of four. When the memory enable counter 104 is at a count of four, it generates an inhibit output which inhibits any further clock pulses from passing through the inhibit gate 106 and thus the memory enable counter will remain at a count of four until it is cleared to zero via OR gate 102. The latter will not occur until the write enable counter 100 receives the fifth horizontal sync pulse following the vertical. The counter 104 will be cleared every fourth H pulse. Thus, it can be seen that following the vertical sync pulse, the first two horizontal lines are written into the I memory, the next two horizontal lines are ignored and the sequence continues in this manner.

Referring back to FIG. 3, it can be seen that the $I_{01}$ submemory 128 is read out at times 1128 and 3254 of the frame counter. This is accomplished, as shown in FIG. 4, by providing the decoded outputs 1128 and 3254 from the frame counter to the OR gate 132 whose output in turn is connected to the set input of a flipflop 130. When the flipflop is set at the proper time, the READ ENABLE $I_{01}$ logic signal will be generated and will be applied via OR gate 118 to select memory $I_{01}$ for read out operation. The READ ENABLE $I_{01}$ signal also closes AND gate 122 to provide the read out clock pulses at the rate of 29/4 megahertz via AND gate 122 and OR gate 124 to the address counter 126. When the address counter 126 reaches a count of 47 indicating that its contents has been completely cleared, an $I_{01}$ DETECT 47 signal is applied to AND gate 134, and since the other input to the AND gate is the set output from flipflop 130, the flipflop will reset thereby terminating the read out from memory $I_{01}$. The read enable circuitry for submemory $I_{02}$ is identical to that just described with the sole exception being that the corresponding flipflop for controlling read out from $I_{02}$ is set at times 2028 and 4154 of the frame counter. By comparing the times of the write operation with times of the read out operation, and noting that the frame counter which controls read out is set to a count of zero by the vertical sync pulse and every fourth H pulse thereafter, it can be seen that there is no overlap between the reading and writing operations of a single submemory. It will also be noted that the read-out rate is at a much higher rate that the write-in rate. The 29/4 megahertz clock rate (actually 29.43/4) can be derived by dividing the output clock rate of 29.43 megahertz by a divide by four counter, now shown.

The circuitry for writing information into and reading information from the $Q_{01}$ and $Q_{02}$ submemories is substantially identical to that for the $I_{01}$ and $I_{02}$ submemories. The only differences are that the data comes from the Q DPCM, the write-in clock rate is 0.6679 megahertz, the address counters count to 18 rather than 47, and the times at which the read enable signals are generated correspond to the times for read out of $Q_{01}$ and $Q_{02}$ shown in FIG. 3.

Figure 5:
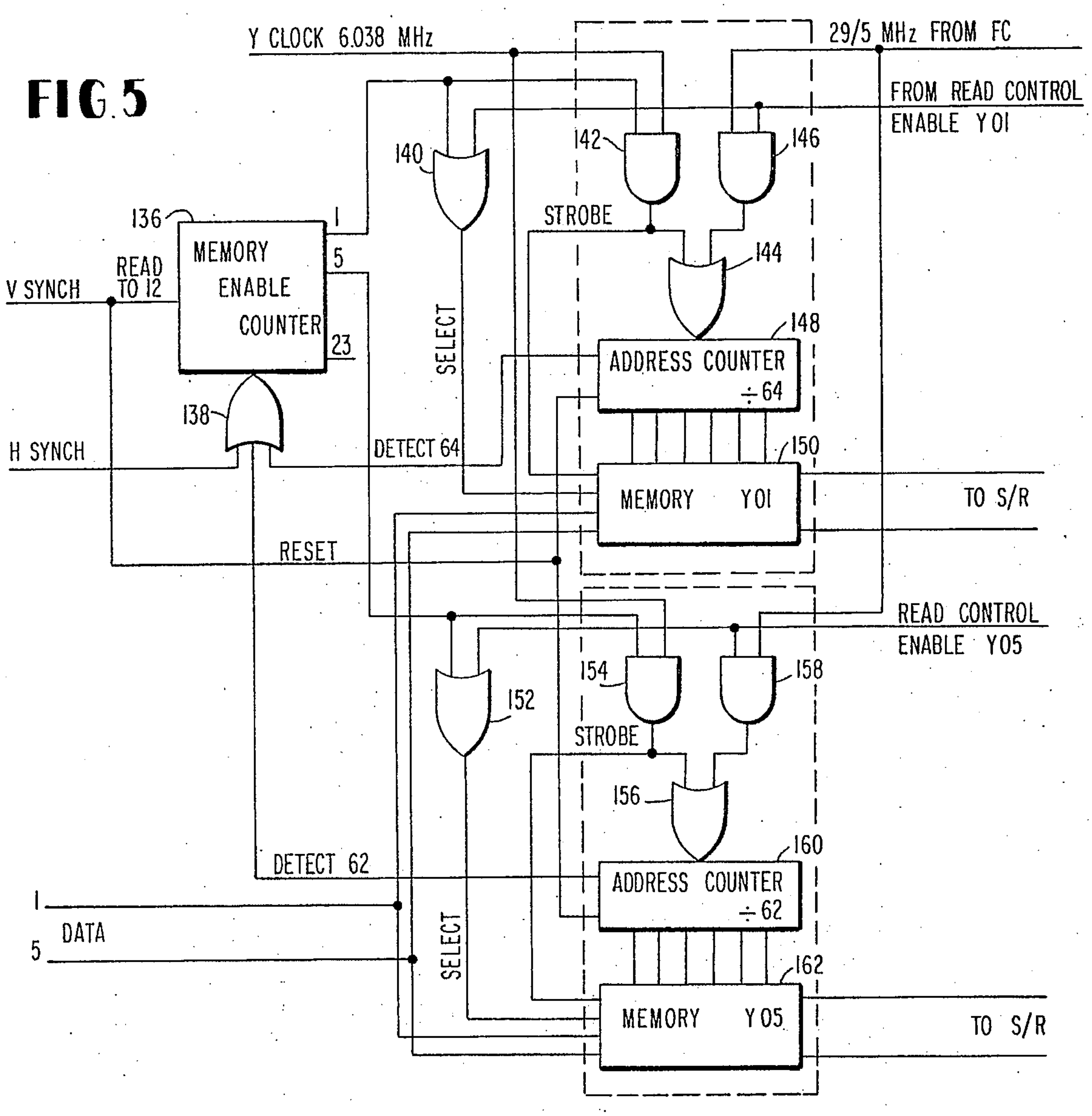
FIG. 5 is a block diagram illustrating the write control logic for the Y submemories in the transmitter.
Figure 6:
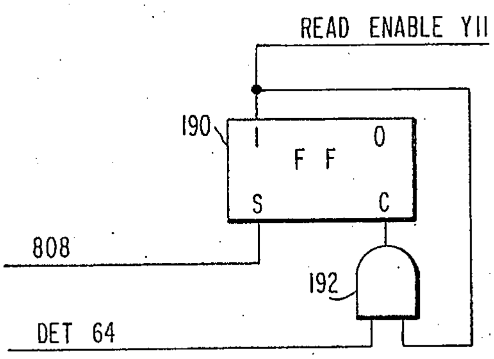
FIG. 6 is a block diagram illustrating the read control logic for one of the Y submemories of the transmitter.

A detailed example of the Y submemories and the associated write control circuitry and an example of the read control circuitry are illustrated in FIGS. 5 and 6. As previously explained, the Y memory consists of 20 submemories, $Y_{01}$ through $Y_{20}$. Each of the submemories, $Y_{05}$, $Y_{10}$, $Y_{15}$ and $Y_{20}$ has the capacity for storing 62 five-bit words and each of the remaining Y submemories has the capacity for storing 64 five-bit words. For simplicity, only submemories $Y_{01}$ and $Y_{05}$ and their associated logic circuitry are illustrated, but it will be understood that the remaining Y submemories and their logic circuitry are identical.

The write control circuitry for the Y submemories includes a memory enable counter 136 which counts between zero and twenty three and then recycles. The counts of the counter 136 control the respective Y submemories during the write-in operation as follows: Counts 1 through 5 control submemories $Y_{01}$ through $Y_{05}$, respectively; counts 7 through 11 control submemories $Y_{06}$ through $Y_{10}$; counts 13 through 17 control submemories $Y_{11}$ through $Y_{15}$; and counts 19 through 23 control submemories $Y_{16}$ through $Y_{20}$.

None of the submemories is selected by counts zero, six, twelve and eighteen of counter 136. The vertical sync pulse from the sync stripper operates to reset memory enable counter 136 to a count of zero. The next horizontal sync pulse passes through OR gate 138 to advance the counter to a count of one thereby selecting submemory $Y_{01}$. Each horizontal sync pulse advances the counter by one increment. Also, each time one of the submemories is filled, the memory enable counter is advanced by one increment.

Since the writing operation of all of the memories is identical, the write-in operation for submemories $Y_{01}$ and $Y_{05}$ should suffice to explain the overall write-in operation. The five-bit data words from the Y DPCM are applied in parallel to all of the submemories but are only entered into the particular submemory which is selected. When the memory enable counter is at a count of one, submemory $Y_{01}$ is selected via OR gate 140. Also, the AND gate 142 is closed enabling the Y write-in clock pulses to be applied to the submemory $Y_{01}$ and via OR gate 144 to the address counter 148 associated with the submemory $Y_{01}$. As the clock pulses strobe the address counter 148 and the selected submemory $Y_{01}$, the five-bit words are entered into the address locations of the submemory. When 64 words corresponding to approximately one-fifth of a line of information have been entered into submemory $Y_{01}$, a detect 64 logic signal from address counter 148 is generated and passes through OR gate 138 to advance the memory enable counter 136 to a count of two. The latter count selects memory $Y_{02}$ in the same manner as described above for submemory $Y_{01}$. When the memory enable counter 136 reaches the count of five, the submemory $Y_{05}$ is selected via OR gate 152 and the clock pulses are gated through AND gate 154 and OR gate 156 to strobe the submemory $Y_{05}$ and the associated address counter 160. When the latter submemory receives 62 five-bit input words, a detect 62 logic signal from address counter 160 will be generated and will pass through OR gate 138 to advance memory enable counter 136 to a count of six. As will be recalled, when memory enable counter 136 is at a count of six, none of the Y submemories is selected. The next event occurring will be the horizontal sync pulse preceeding the subsequent Y line of information. The horizontal sync pulse will advance the memory enable counter to a count of seven thereby selecting submemory $Y_{06}$ to receive the first 64 five-bit words of the succeeding line of Y information.

Read-out from the Y submemories is provided by generating read control enable signals for each of the individual Y submemories at the proper time shown on the tme scale in FIG. 3. As shown in FIG. 5, the read control enable $Y_{01}$ signal closes AND gate 146 to pass clock pulses at the rate of 29/5 megahertz per second (actually 29.43/5) through OR gate 144 to step address counter 148. The read control enable $Y_{01}$ signal also passes through OR gate 140 to select submemory $Y_{01}$. The read control enable $Y_{05}$ signal closes AND gate 158 to pass the readout clock pulses therethrough and subsequently through OR gate 156 to step address counter 160 associated with submemory $Y_{05}$. The read control enable $Y_{05}$ signal also passes through OR gate 152 to select memory $Y_{05}$.

The generation of the read control enable signals for the Y submemories is similar to the logic for generating the read control enable signals for the I and Q submemories. As an example, the circuitry for generating the read control enable $Y_{11}$ signal is illustrated in detail in FIG. 6. The logic for generating a read control enable signal for the other Y submemories will be identical with the only difference being that different timing inputs are applied to the set input of flipflop 190. The exact timing input for any of the Y submemory read control logic circuits corresponds to the read-out time illustrated in FIG. 3. An output from the frame counter, corresponding to the correct read out time shown in the time scale in FIG. 3 sets flipflop 190. For submemory $Y_{11}$, the correct read out time is time 0808 of the frame counter. Thus, read enable $Y_{11}$ will be generated to cause a read-out from submemory $Y_{11}$ beginning at time 0808. When the address counter associated with submemory $Y_{11}$ reaches a count of 64, a detect 64 signal from that address counter will be applied via AND gate 192 to reset flipflop 190 thereby removing the read enable $Y_{11}$ signal.

Referring back to FIG. 1, the words read out of the Y, I and Q submemories are provided in parallel to the respective shift registers 78, 80 and 82. The shift registers are provided to convert each of the data words, which are read from the memories parallel-by-bit into serial-by-bit form at the rate of 29 megahertz. The sync word generator 86 may be any conventional device for generating a 16 bit unique word in response to an actuating signal at the desired time and in response to 16 clock pulses at the rate of 29 megahertz. The audio shift register 90 receives each 16 bit audio word (one per horizontal line of video information) and shifts its contents out serially in response to the timing signal from the frame counter and 16 clock pulses at the 29 megahertz rate. Thus, the output at OR circuit 84 is a serial bit stream which is arranged in transmission frames and which has an overall bit rate of 29.43 megahertz. Each frame is identified by a 16-bit sync word and includes four lines of Y data, four 16-bit audio words, two lines of I data and two lines of Q data. The format of the serial information for each frame is illustrated in FIG. 3.

It is preferrable to provide some error detecting and/or correcting means in the digital transmission system for reasons which will be well understood by one having ordinary skill in the art. Although the invention is not intended to be limited to any particular type of error detecting or correcting scheme, one preferred error correcting system known as a 7/8 convolutional encoder, and which is described in "Applications of Error Coding Techniques to Satellite Communications," by W.W. Wu, Comsat Technical Review, Volume 1, number 1, Fall 1971, pp. 183–219, is preferred. The output bit stream from the convolutional encoder is then sent to the transmitter modem where the bit stream modulates the carrier signal and is transmitted via a satellite link to a distant ground station.

Figure 7:
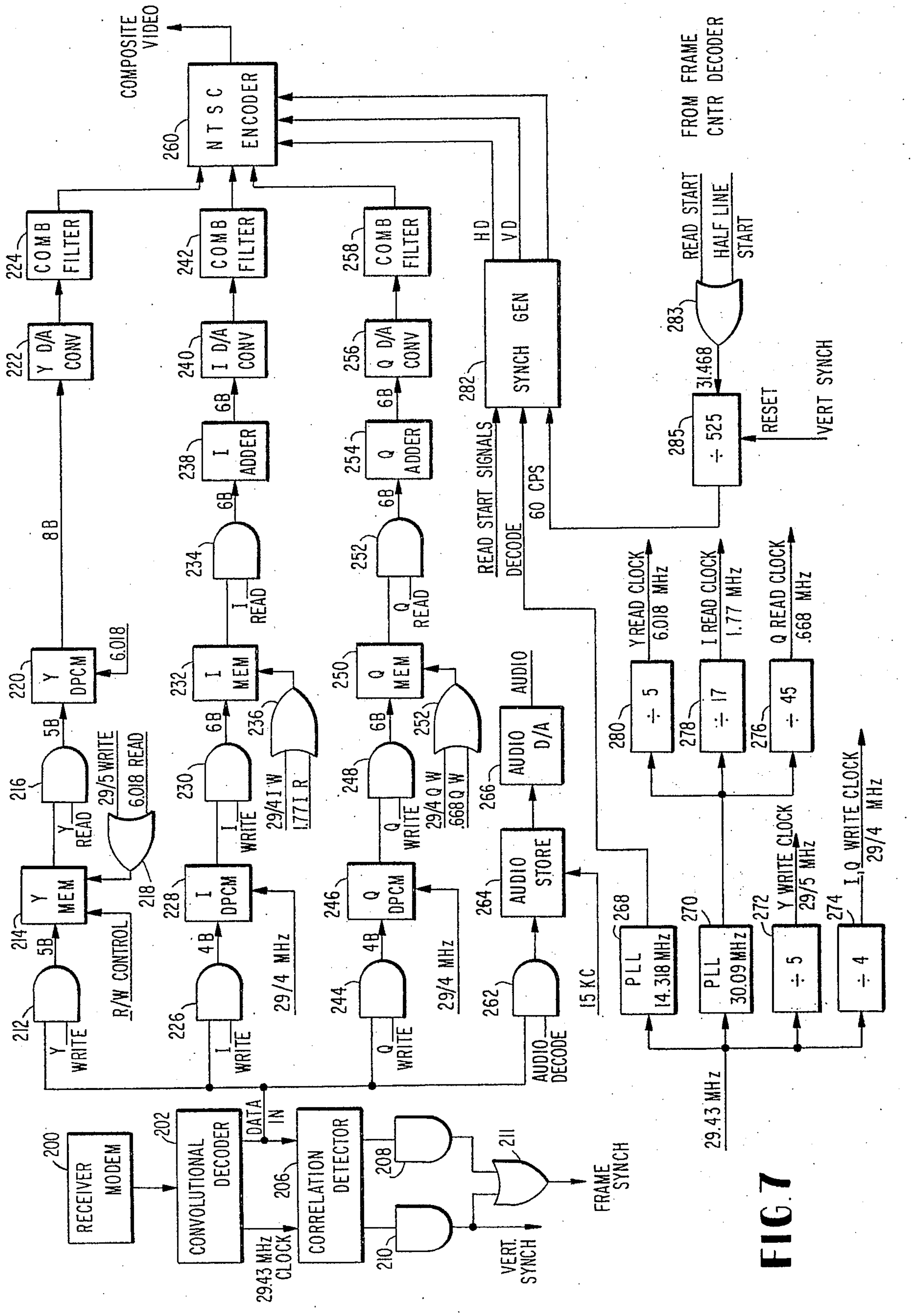
FIG. 7 is a general block diagram of the receive side of the digital television transmission system.

A general block diagram of the receive side of the digital television communications system is illustrated in FIG. 7. The signals transmitted from the transmitter are relayed via a satellite link to the receiver and applied to a conventional receiver modem 200 which results in an output bit stream corresponding, with possible errors, to the input bit stream applied to the transmitter modem. Where a convolutional encoder of the type referred to above is used at the transmitter side, a convolutional decoder 202 of complementary type is provided at the receive side to receive the output bit stream and bit timing signals from the receiver modem 200. The outputs from the convolutional decoder 202 are a data stream having a bit rate of 29.43 megahertz and a recovered clock signal at the rate of 29.43 megahertz. The latter clock signal is used to develop various other clock frequencies for use in the receiver circuitry. As illustrated in the lower portion of the Figure, the 29.43 megahertz clock is applied to a 30.09 megahertz phase-locked loop 270 whose output in turn is applied to a divide by five counter 280, a divide by seventeen counter 278, and a divide by forty-five counter 276. The outputs from the latter three counters are respectively the Y read clock at 6.018 megahertz, the I read clock at 1.77 megahertz, and the Q read clock at 0.668 megahertz. The 29.43 megahertz clock is also divided by five in counter 272 and divided by four in counter 274 to result in the Y write clock and the I and Q write clocks, respectively. The 29.43 megahertz clock is also applied to a 14.318 megahertz phase-locked loop 268 to develop an output frequency which is four times the 3.58 megahertz the color subcarrier. The output from phase-locked loop 268 is used to derive the color sub-carrier in a conventional sync generator 282.

The 29.43 megahertz clock from the convolutional decoder and the data stream therefrom are applied to a correlation detector 206, which may be a conventional type of correlation detector The detector 206 detects the frame sync word which preceeds every transmission frame and the vertical sync word. When a frame sync word is detected, a frame sync output appears at gate 208, and when the vertical sync word is detected, a vertical sync output appears at gate 210. The outputs from AND gate 208 and 210 are applied to an OR gate 211 whose output synchronizes a receiver frame counter to be described later.

Figures 8, 10:
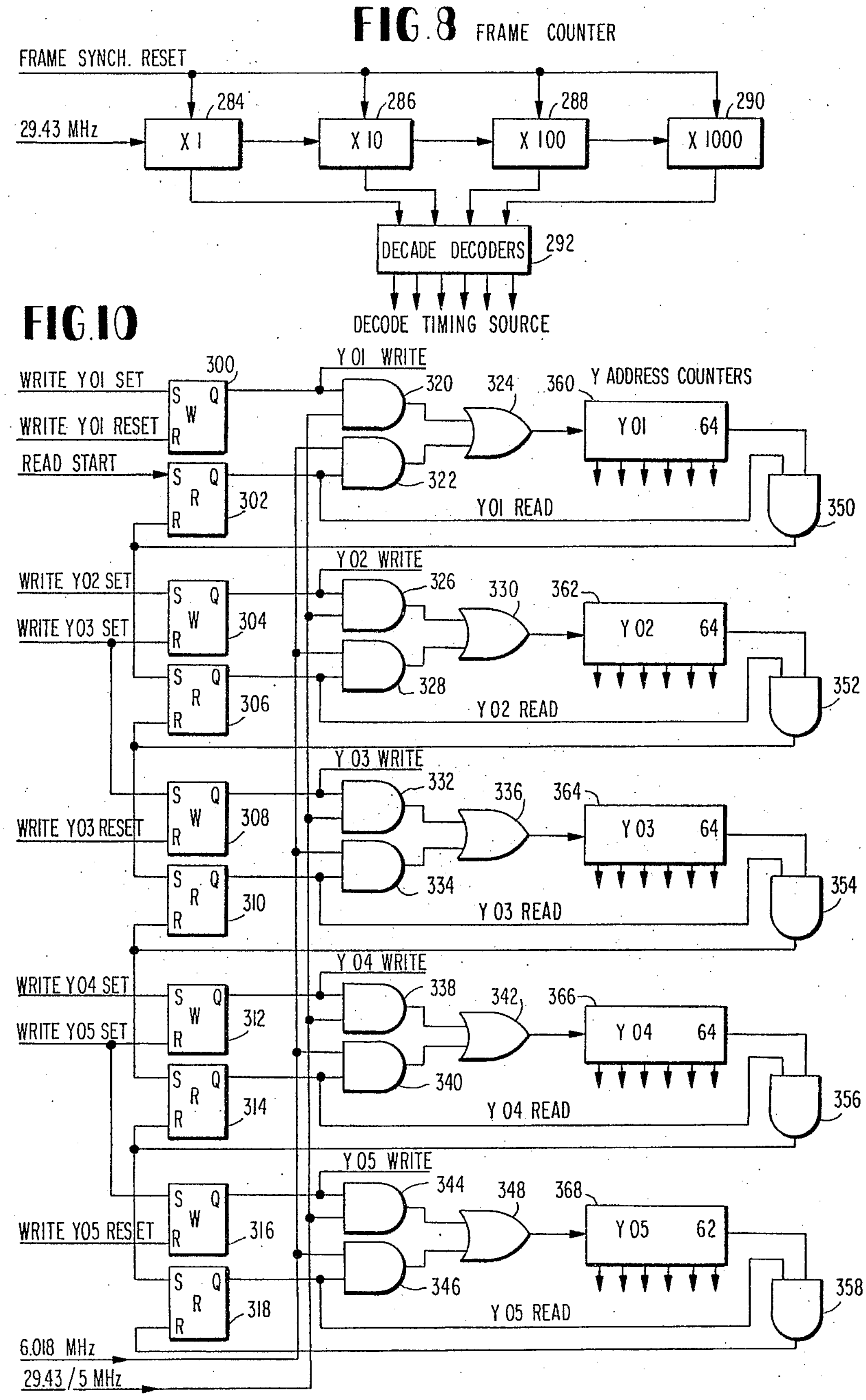
FIG. 8 is a block diagram of the receiver frame counter and decoder.
FIG. 10 is a block diagram illustrating the read/write operation of the Y submemories in the receiver.
Figure 9:
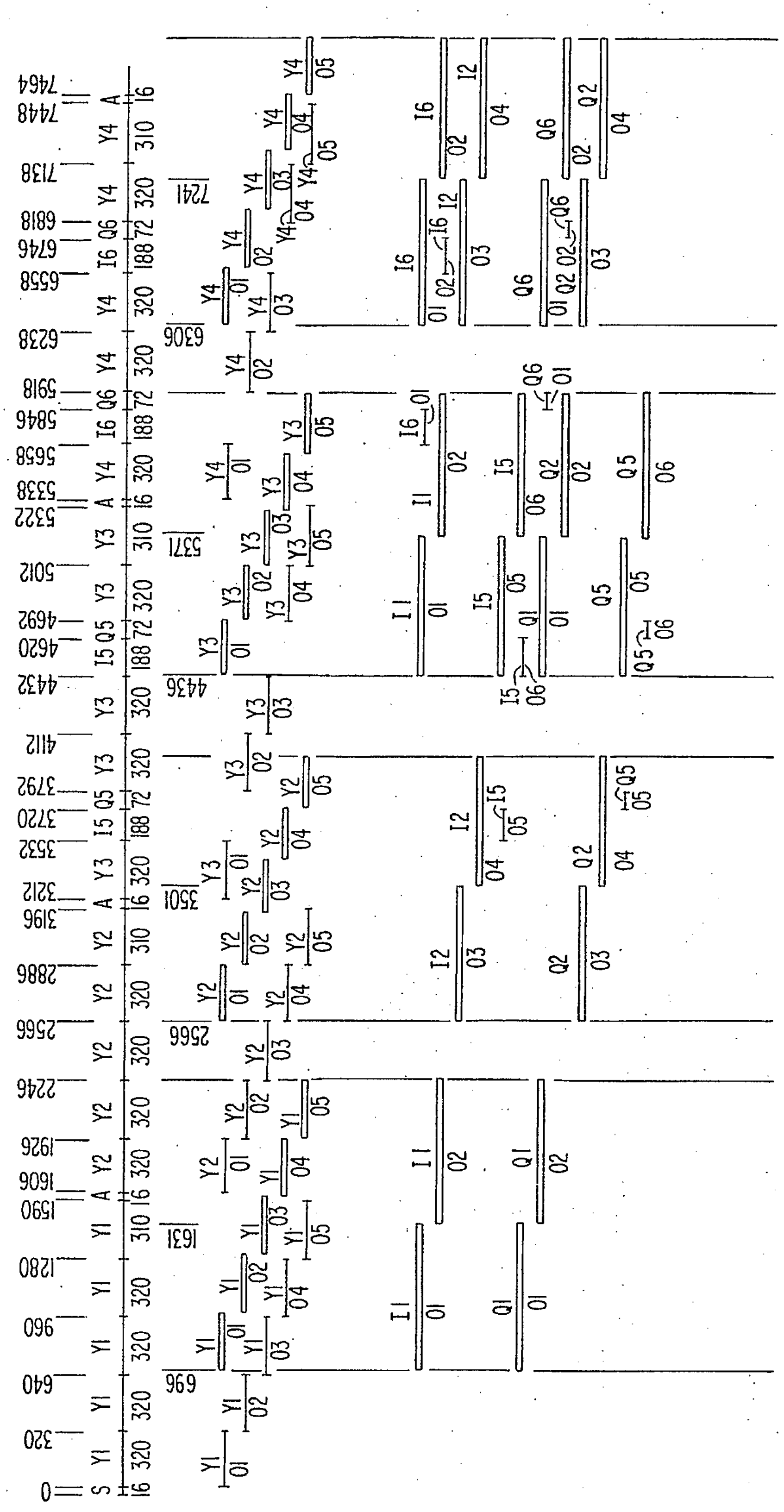
FIG. 9 is a timing diagram illustrating the write and read times for the receiver submemories.

The format of the transmitted frame, and therefore also the received frame, is illustrated in FIG. 9. The individual segments of the bit stream Y, I and Q and audio, are segregated or demultiplexed into four separate channels by means of gates 212, 226, 244 and 262 shown in FIG. 7. The respective gates are closed at the proper times by means of timing signals which are derived from the frame counter shown in FIG. 8. The latter frame counter may be identical to the frame counter on the transmit side of the system. As shown in FIG. 8, the frame counter comprises four decade counters 284, 286, 288 and 290, and a decade decoder 292. The frame counter is reset to a count of zero by the output from OR gate 211 (FIG. 7) and accumulates the 29.43 megahertz clock pulses. The decade decoder 292 may be any type of conventional logic circuit for deriving timing outputs at the desired time counts of the frame counter.

A Y write signal applied to gate 212 gates the Y segments into a Y buffer memory 214; a Y read signal applied to gate 216 gates the Y data from the Y buffer memory 214 into the Y DPCM 220. The Y DPCM is preferably the receive side of a digital differential pulse code modulator with edge recoding of the type referred to above and described in more detail in the above referenced co-pending application. As will be recalled, the Y DPCM in the transmit side receives eight bit samples and provides five bit output samples. On the receive side, the Y DPCM 220 receives five bit samples and provides eight bit sample outputs. The output from the Y DPCM 220 corresponds to the input to the Y DPCM in the transmit side. The eight bit samples are converted into analog form by a Y digital to analog convertor 222 whose output is in turn applied to a comb filter 224. The comb filter 224 is provided because of the frequency interleaved sampling technique used in the transmitter. A detailed example of the comb filter 224 is given in the above referenced copending patent application relating to frequency interleaved sampling. The I and Q channels are similar to the Y channel except that each includes an adder preceeding the respective digital to analog convertors 240 and 256. Since the transmitter only transmits every other pair of I and Q lines, the adders 238 and 254 are included to construct the missing I and Q lines. It will be noted that in the I and Q channels the DPCM's 228, and 246 preceed the buffer memories 232 and 250, whereas in the Y channel the buffer memory 214 preceeds the DPCM 220. This difference is not critical. For example, in all three channels the DPCM's may preceed or succeed the buffer memories. Of course, considering the Y channel, if the DPCM 220 preceeded the buffer memory, the memory capacity would have to be larger because the memory would receive eight bit words rather than five bit words.

The I DPCM and Q DPCM 228 and 246, respectively, are of the same type as the Y DPCM 220. The only difference is that they receive four bit words and provide six bit output words. The comb filters 242 and 258 in the I and Q channels respectively, are also necessary because of the frequency interleaved sampling technique used in the transmitter and are disclosed in detail in the above referenced co-pending patent application relating to frequency interleaved sampling. The Y, I and Q analog output signals from the comb filters 224, 242, and 258 respectively, are applied to an NTSC encoder 260 which may be of a conventional type. Also, the sync generator 282 provides the 3.58 megahertz color subcarrier, the vertical sync pulses, and the horizontal sync pulses to the NTSC encoder 260. The output of the NTSC encoder is a composite video signal corresponding to the composite video signal input at the transmitter.

The fourth channel, which is the audio channel, extracts the audio segments from the input data stream by means of gate 262 and an audio decode input signal. The 16 bit audio segments are provided to an audio buffer store 264 and read out at the horizontal line rate of 15.75 kilohertz. The 15.75 kilohertz signal may be derived by multiplying the frame sync pulse by four. The output from the audio store 264 is converted into an analog audio signal in the digital to analog convertor 266 to provide the required audio output signal.

The read and write timing for the Y, I and Q memories 214, 232, and 250, will now be described in greater detail. Referring to FIG. 9, the time scale for a complete frame is illustrated along a top line and the numbers above the line correspond to the time counts of the frame counter of FIG. 8. The horizontal bars in the graph represent the write times of the respective buffer memories, and the horizontal rectangles represent the read times of the respective buffer memories. The subscripts above the bars and rectangles refer to the Y, I and Q lines being written into or read out from the submemories, and the numbers below the bars and rectangles designate the particular submemories being written into or read from. In the receiver embodiment being described there are five Y submemories which comprise the Y buffer memory, six I sub-memories which comprise the I buffer memory, and six Q submemories which comprise the Q buffer memory. The Y submemories are designated $Y_{01}$ through $Y_{05}$ and each, except for $Y_{05}$, has a capacity for storing 64 five-bit words. Submemory $Y_{05}$ has a capacity for storing 62 five-bit words. The combined capacity for all of the Y submemories is a single line of Y data. Each of the I submemories, $I_{01} - I_{06}$ has a capacity for storing 47 six-bit I words and each of the Q submemories, $Q_{01} - Q_{06}$ has a capacity for storing 18 six-bit Q words.

The relation between the writing and reading of the Y and I lines, and the particular I submemories read out to obtain the I lines are shown in table II below.

TABLE II.—RECEIVE TERMINAL

| Y line write | Y line read | I line write | I sub-memory | I line read | I read submemory |
|---|---|---|---|---|---|
| | | 1 | 01, 02 | | |
| | | 2 | 03, 04 | | |
| 1 | 1 | | | 1 | 01, 02 |
| 2 | 2 | | | 2 | 03, 04 |
| 3 | 3 | 5 | 05, 06 | 1, 5 | 01, 02+05, 06 |
| 4 | 4 | 6 | 01, 02 | 2, 6 | 03, 04+01, 02 |
| 5 | 5 | | | 5 | 05, 06 |
| 6 | 6 | | | 6 | 01, 02 |
| 7 | 7 | 9 | 03, 04 | 5, 9 | 05, 06+03, 04 |
| 8 | 8 | 10 | 05, 06 | 6, 10 | 01, 02+05, 06 |
| 9 | 9 | | | 9 | 03, 04 |
| 10 | 10 | | | 10 | 05, 06 |
| 11 | 11 | 13 | 01, 02 | 9, 13 | 03, 04+01, 02 |
| 12 | 12 | 14 | 03, 04 | 10, 14 | 05, 06+03, 04 |
| 13 | 13 | | | 13 | 01, 02 |
| 14 | 14 | | | 14 | 03, 04 |
| 15 | 15 | 17 | 05, 06 | 13, 17 | 01, 02+05, 06 |
| 16 | 16 | 18 | 01, 02 | 14, 18 | 03, 04+01, 02 |
| 17 | 17 | | | 17 | 05, 06 |
| 18 | 18 | | | 18 | 01, 02 |
| 19 | 19 | 21 | 03, 04 | 12, 21 | 05, 06+03, 04 |
| 20 | 20 | 22 | 05, 06 | 18, 22 | 01, 02+05, 06 |
| 21 | 21 | | | 21 | 03, 04 |
| 22 | 22 | | | 22 | 05, 06 |
| 23 | 23 | 25 | 01, 02 | 21, 25 | 03, 04+01, 02 |
| 24 | 24 | 26 | 03, 04 | 22, 26 | 05, 06+03, 04 |

The above table illustrates why the Y lines had to be delayed relative to the I lines in the transmitter. For example, by the time $Y_1$ is received at the receiver and written into memory, the I lines $I_1$ and $I_2$, will be ready for read out. Line $Y_1$ is read out substantially immediately after it is written in, and line $I_1$ is read out simultaneously. Lines $Y_2$ and $I_2$ are also read out simultaneously. Lines $I_3$ and $I_4$ are non-existent in the received data and must be reconstructed. The lines $Y_3$ and $I_5$ are received and written into respective memories substantially simultaneously. When $Y_3$ is read out, $I_1$ and $I_5$ are also read out and averaged to reconstruct $I_3$. Consequently, lines $I_3$ and $Y_3$ will be in proper time coincidence in the receiver read out sequence. The remainder of the read/write operation follows the same pattern. The relationship of the Q read/write sequence is not shown in Table II but it is identical to the I read/-write sequence.

Figure 11:
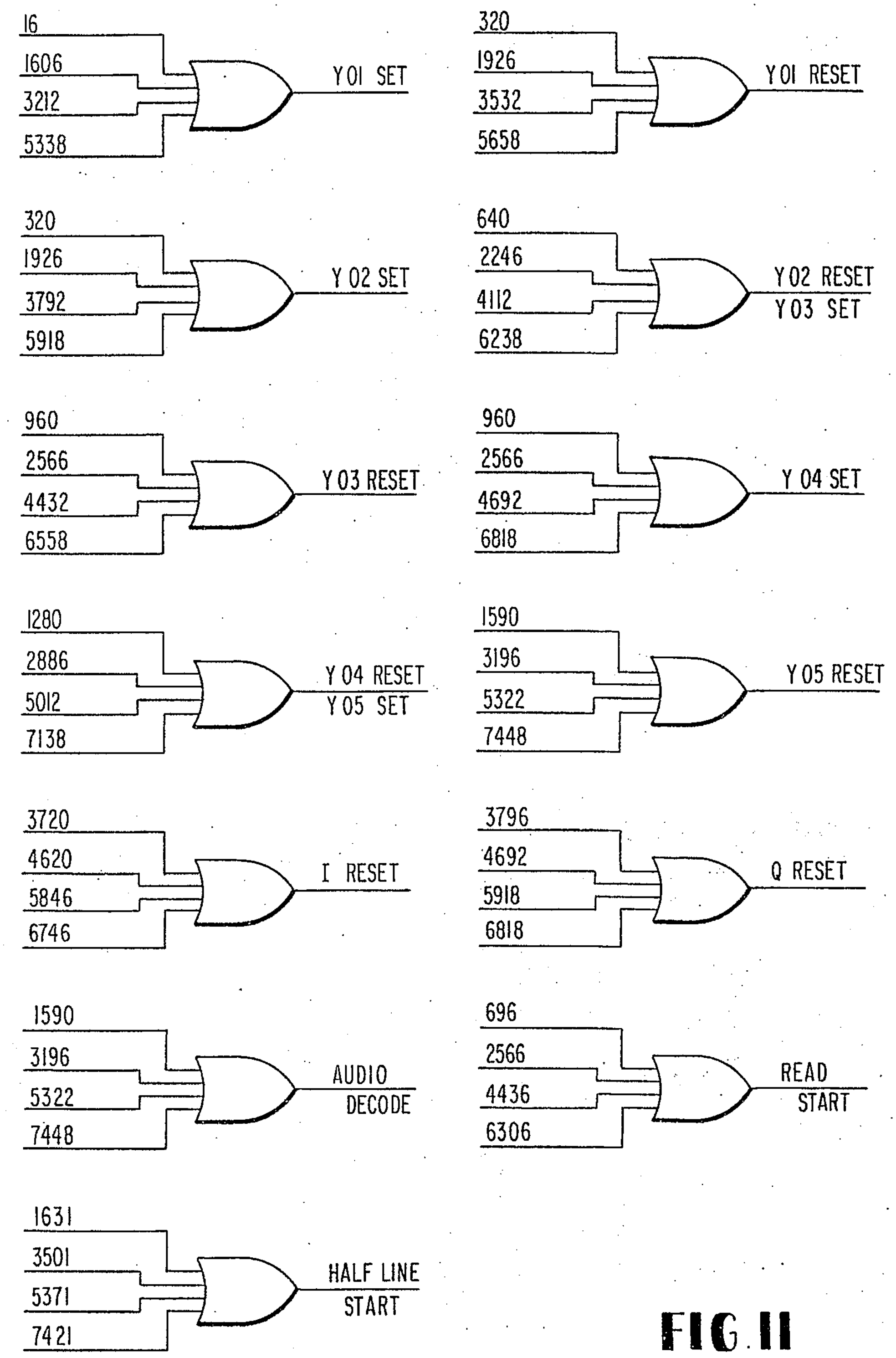
FIG. 11 illustrates logic for deriving control signals for controlling certain operations in the receiver.

The detailed logic for controlling the write and read of the Y submemories, $Y_{01} - Y_{05}$ is illustrated in FIG. 10. For simplicity, the Y submemories are not shown, but as will be apparent, the $Y_{01} - Y_{05}$ address counters, which are illustrated, control the addressing of the respective Y submemories, and each of the submemories is adapted to receive the five-bit input words applied thereto by gate 212 shown in FIG. 7. The logic comprises flipflops 300 through 318, gates 320 through 358, and address counters 360 through 368. The input signals, Write $Y_{01}$ Set, Write $Y_{01}$ Reset, Write $Y_{02}$ Set, etc., are generated at specific times of the frame counter. The exact times correspond to the times at which the Y segments are being received. Simple OR circuits which are illustrated in FIG. 11 may be used to develop the proper input signals. As shown in FIG. 11, the $Y_{01}$ Set signal, which signifies start writing into submemory $Y_{01}$, occurs four times each frame at the times 16, 1606, 3212 and 5338. Referring to FIG. 9 it can be seen that the latter times indicate the beginning of the write operation into the $Y_{01}$ submemory. The timing for all the other signals can also be found in the graph of FIG. 9. It will be noted that the read start signal occurring at times 696, 2566, 4436 and 6306 corresponds to the beginning of read out for each horizontal line.

Referring back to FIG. 10, the $Y_{01}$ Set signal sets flipflop 300 thereby generating a $Y_{01}$ write signal. The $Y_{01}$ write signal selects submemory $Y_{01}$ for operation. The latter signal also closes gate 320 to pass the write clock pulses at the rate of 29.43/5 megahertz through gate 324 to the $Y_{01}$ address counter 360. The latter counter accumulates the clock pulses counting from 1 to 64 and controlling the $Y_{01}$ submemory to enter 64 successive five bit words into storage. When the $Y_{01}$ address counter 360 reaches a count of 64 it provides an output pulse to the gate 350. However, gate 350 will be open during the write operation. Flipflop 300 is reset by the $Y_{01}$ Reset signal. When the $Y_{02}$ Set signal occurs, flipflop 304 is set thereby generating a $Y_{02}$ Write signal which actuates the $Y_{02}$ submemory and also passes the write clock pulses through gates 326 and 330 to the $Y_{02}$ address counter 362. The $Y_{03}$ Set signal resets flipflop 304 and sets flipflop 308 thereby generating a $Y_{03}$ Write signal which actuates submemory $Y_{03}$. Also, the set output from flipflop 308 gates the write clock pulses through gates 332 and 336 to the $Y_{03}$ address counter 364. The remainder of the write operation is the same as that just described and is self-explanatory in view of the logic and input signals illustrated in FIG. 10. Each of the $Y_{0X}$ Write signals is also applied to gate 212, shown in FIG. 7. Each time a Y segment is received it is entered into one of the Y submemories in sequence.

Read out from the five Y submemories is sequential and continuous for each Y line and therefore only one starting signal is necessary. The Read Start signal, which occurs four times during each frame, sets flipflop 302 thereby generating the $Y_{01}$ Read signal. The set output from flipflop 302 actuates the $Y_{01}$ submemory and also passes the read out clock pulses at the rate of 6.018 megahertz via gates 322 and 324 to the $Y_{01}$ address counter 360.

When the $Y_{01}$ address counter 360 reaches a count of 64, it provides an output pulse which passes through gate 350 and sets flipflop 306. Gate 350 is closed by the $Y_{01}$ read signal from flipflop 302. The output from gate 350 also resets flipflop 302. When flipflop 306 is set, the output therefrom actuates the $Y_{02}$ submemory and also passes the read clock pulses through gates 328 and 330 to the $Y_{02}$ address counter 362. The sequence is identical for the read operation of submemories $Y_{01}$ through $Y_{05}$. The next read out sequence for the five submemories begins in response to the next read start pulse applied to flipflop 302. Each of the $Y_{0X}$ Read signals is also applied to the read gate 216 in FIG. 8.

The logic for controlling the write and read operations of the I submemories is substantially identical to the logic for controlling the Q submemories, with the only difference being the times at which the I and Q segments occur in the received frame sequence and therefore, the time at which the I and Q segments are written into their respective submemories. Due to the substantial identity of the logic systems only the logic system for the I submemories will be illustrated in detail.

Figure 12:
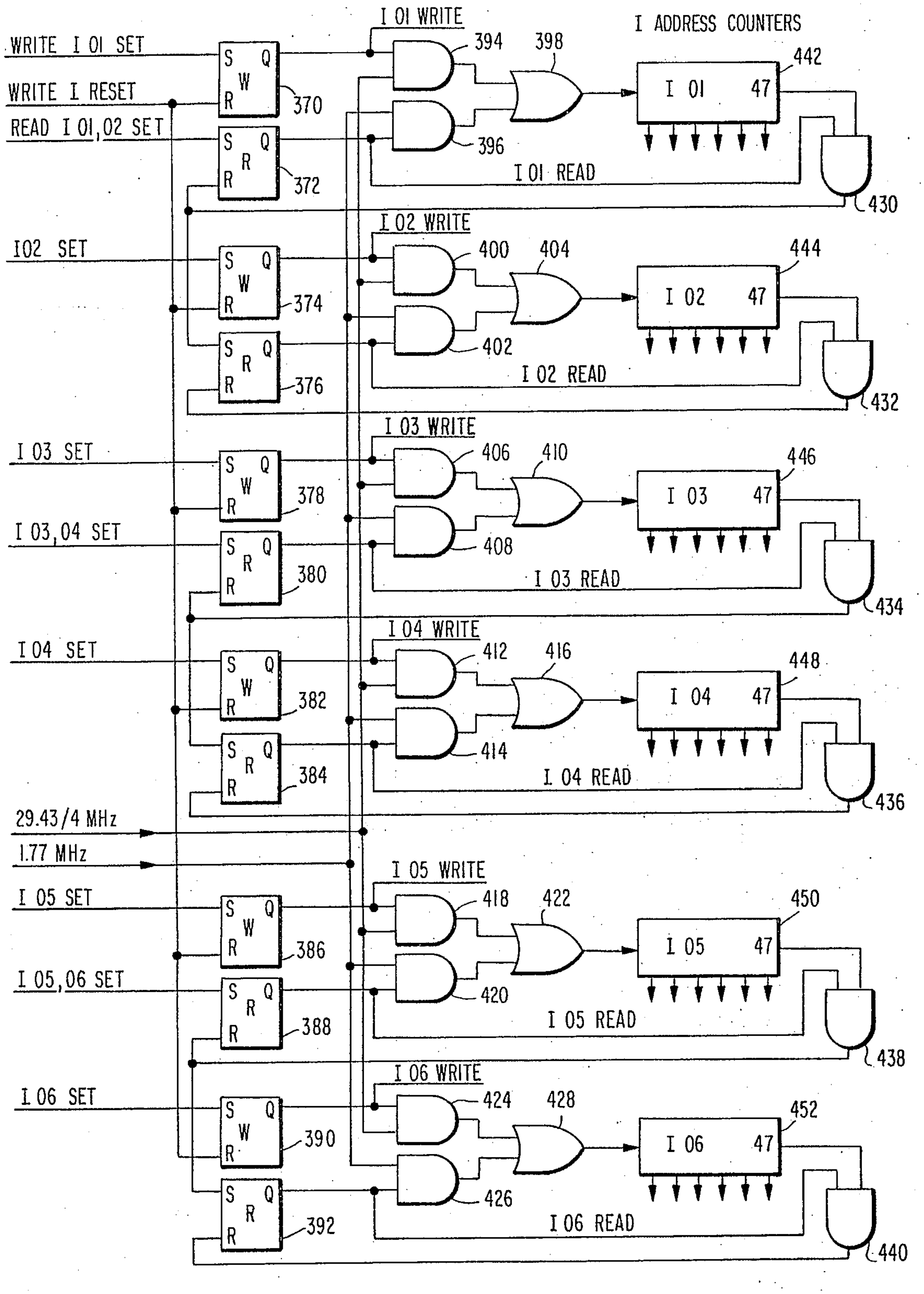
FIG. 12 is a block diagram illustrating the read/write operation of the I submemories in the receiver.

Referring to FIG. 12, there is shown the logic associated with the six address counters for the six I submemories. Associated with each address counter are a pair of flipflops and four gates. For example, the $I_{01}$ address counter 442 has associated therewith a write flipflop 370, read flipflop 312 and gates 394 through 430. The logic for generating the proper timing signals applied to the flipflops will be described in connection with subsequent figures. The write operation for each I submemory is identical and is started by the respective Write $I_{0X}$ Set signal (where X is any number between 1 and 6). Only the write operation for $I_{01}$ will be described in detail. When the Write $I_{01}$ Set signal occurs flipflop 370 is set thereby generating an $I_{01}$ Write signal which selects submemory $I_{01}$ for writing. The latter signal also passes the I write clock pulses at the rate of 29.43/4 megahertz through gates 394 and 398 to the $I_{01}$ address counter 442. The $I_{01}$ submemory is actuated to load the received I segment, which comprises 47 six-bit words, into storage. After the 47th word is stored, an output appears from address counter 442 but does not pass through the gate 430 which is open during the write sequence. The $I_{01}$ write flipflop 370 is reset by the Write I Reset signal. Note that the latter signal is used to reset all of the write flipflops 370, 374, 378, 382, 386 and 390. Each of the $I_{0X}$ Write signals is also applied to the gates 226 and 230 in FIG. 8.

The read operation for each of the submemories is begun by setting the respective read flipflop 372, 376, 380, 384, 388 and 392. Unlike the Y submemory logic, all of the I submemories are not read consecutively. This can be seen by the right most column in Table II above. However, the I submemories within each pair of submemories are read consecutively. Thus, for example, submemory $I_{02}$ is always read out immediately succeeding the read out from submemory $I_{01}$. Submemory $I_{04}$ is always read out immediately succeeding the read out from submemory $I_{03}$. Submemory $I_{06}$ is always read out immediately succeeding the read out from submemory $I_{05}$. When the read signal for $I_{01}$ and $I_{02}$ occurs, the read flip flop 372 is set thereby generating an $I_{01}$ Read signal which selects submemory $I_{01}$ for read out operation. The set condition of flipflop 372 also passes the read out clock pulses at the rate of 1.77 megahertz through gates 396 and 398 to the $I_{01}$ address counter 442. When the $I_{01}$ address counter 442 reaches a count of 47, indicating that the contents of submemory $I_{01}$ has been read out, a pulse is provided which passes through gate 430 and operates to reset flipflop 372 and set the read flipflop 376. The set output from flipflop 372 actuates the $I_{02}$ submemory and also passes the read clock pulses through gates 402 and 404 to the $I_{02}$ address counter 442. When the latter submemory has been fully read out, an output pulse from address counter 444 passes through gate 432 and resets flipflop 376 ending the read out of a line of I data from submemories $I_{01}$ and $I_{02}$. The read out from submemories $I_{03}$ and $I_{04}$ and the read out from submemories $I_{05}$ and $I_{06}$ is identical to that just described. The only difference being the time of occurrence of the initial signals which set the respective read flipflops. Each of the $I_{0X}$ Read signals is also applied to the write gate 230 in FIG. 8.

Figure 13:
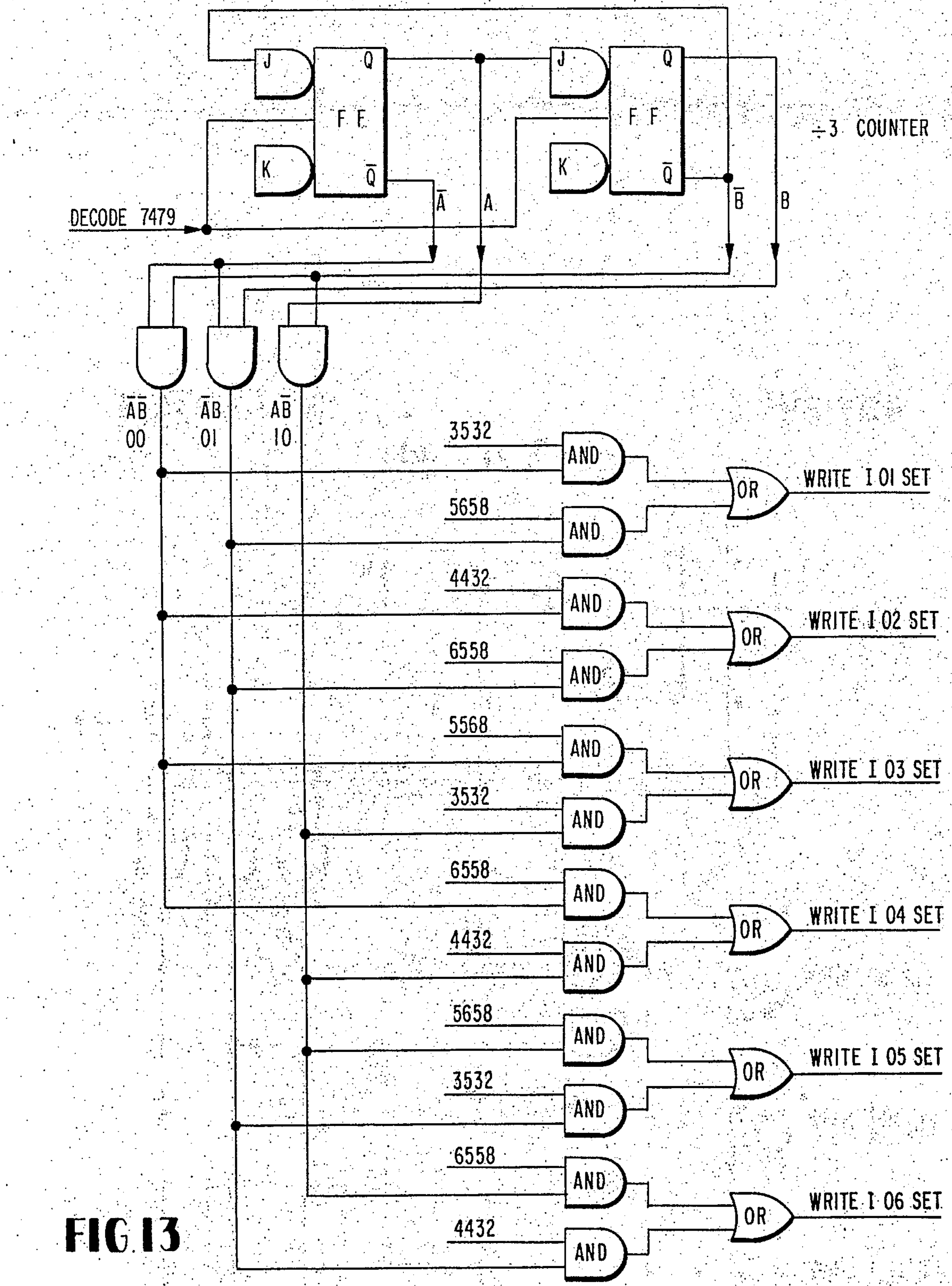
FIG. 13 is a block diagram of logic for generating control signals for the I submemory write sequence.

An example of detailed logic circuitry for generating the Write I Set signals is illustrated in FIG. 13. At the top of FIG. 13 a conventional divide by 3 counter is illustrated. This counter serves the purpose of keeping track of the frame sequence. As can be seen from Table II above, the write and read sequences for the I and Q submemories repeat every three frames, and thus, there is a need for a counter of the type illustrated which keeps track of the first, second and third frames in the write and read sequences. The remainder of FIG. 13 comprises simple gating logic for generating the signals which set the write flipflops of FIG. 12. Each of the AND gates illustrated receives one input representing either the first ($\overline{AB}$), second ($\overline{A}B$) or third ($AB$) counts of the divide by three counter and one input from the frame counter decade decoders 292 (FIG. 8). The logic is self-explanatory and therefore no further description is necessary.

Figure 14:
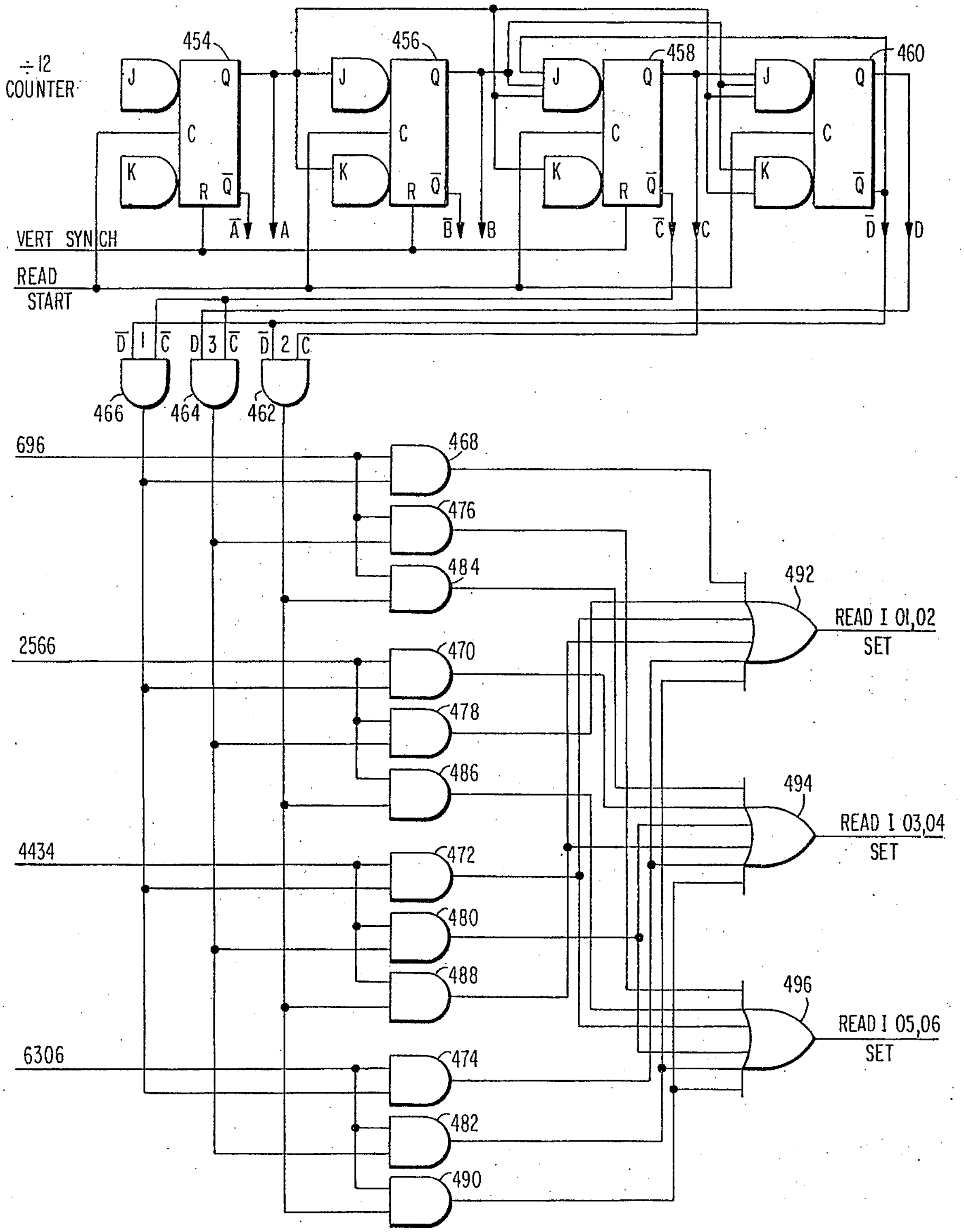
FIG. 14 is a block diagram of logic for generating control signals for the I submemory read sequence.

The logic circuitry for generating the signals which initiate read operation of the I submemories by setting the read flipflops 372, 380 and 388 (FIG. 12) is illustrated in detail in FIG. 14. The logic includes a counter comprising conventional JK flipflops 454, 456, 458 and 460. The counter is actually the combination of a divide by three counter comprising flipflops 458 and 460, and a divide by four counter comprising flipflops 454 and 456. Taken together, the counter overall is a divide by twelve counter. The flipflops 458 and 460 in effect keep track of the three frames in the read sequence whereas the flipflops 454 and 456 in effect keep track of the four read start times within each frame. As will be recalled from the above description, there are four read starts in every frame and each read start signifies the start of read out of a full line of video data. The gating logic of FIG. 14 includes AND gates 462, 464 and 466 whose outputs respectively indicate operation during the second, third and first frame. The outputs therefrom control the selection of gates 468 and through 490. The outputs from gates 468 through 490 are applied to the OR gates 492, 494 and 496 for generating the respective signals which set the read flipflops of FIG. 12. Assuming that the operation is presently taking place during the first frame of a three-frame sequence, there will be a logic one output from AND gate 466. The latter output will be applied to the AND gates 468, 470, 472 and 474. Thus, at the first read start time 696, an output from AND gate 468 will be applied through OR gate 492 to start the read out operation from the $I_{01}$ submemory. As will be recalled, read out from submemory $I_{02}$ follows directly. At the second read start time, 2566, an output from gate 470 will be applied through gate 494 to start the read out of memory $I_{03}$. At the third read start time, 4434, an output from gate 472 will be applied through gates 492 and 496 to start simultaneously the read out from submemories $I_{01}$ and $I_{05}$. For the specific example described herein, the I and Q submemories must either be non-destructive read out memories or they must be of the conventional type which writes data back into the submemory as it is being read out. This is necessary because any given I segment written into any given I submemory must be read out more than once before being replaced by a new segment of I data. At the fourth read start time, 6306, an output from gate 474 will be applied simultaneously to gates 492 and 494 to cause the simultaneous read out from submemories $I_{01}$ and $I_{03}$. Given the latter description, the operation of the logic circuitry of FIG. 14 for frames two and three is self-explanatory. The logic in the Q channel is identical to the logic for the I channel shown in FIG. 12, 13 and 14. However, the input times to the AND gates of FIG. 13 would obviously be different from those shown and would correspond to the time of receipt of the Q data as shown in FIG. 9.

Figure 15:
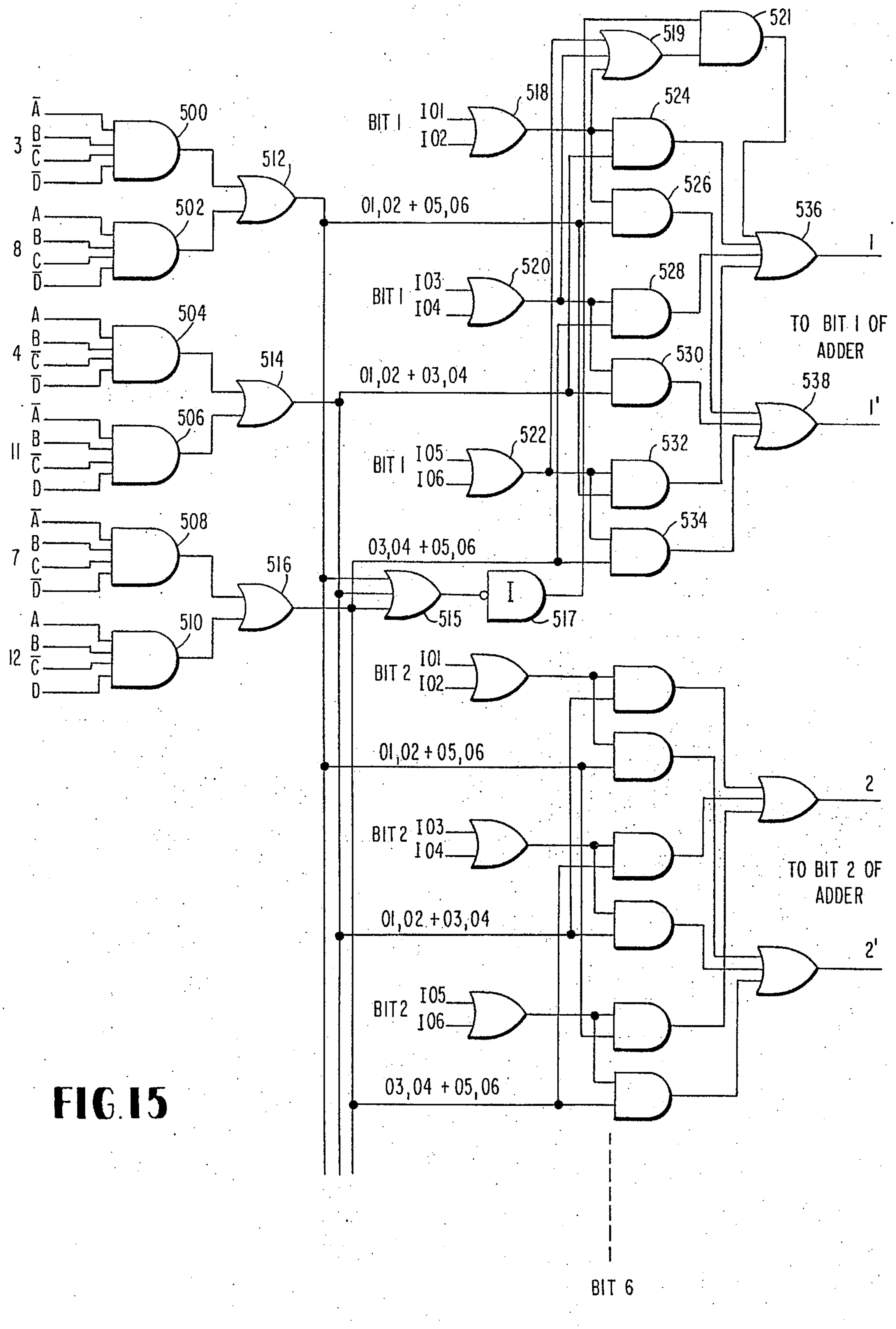
FIG. 15 is a block diagram of a portion of the logic which connects the submemory outputs to the adder in the I channel of the receiver.
Figure 16:
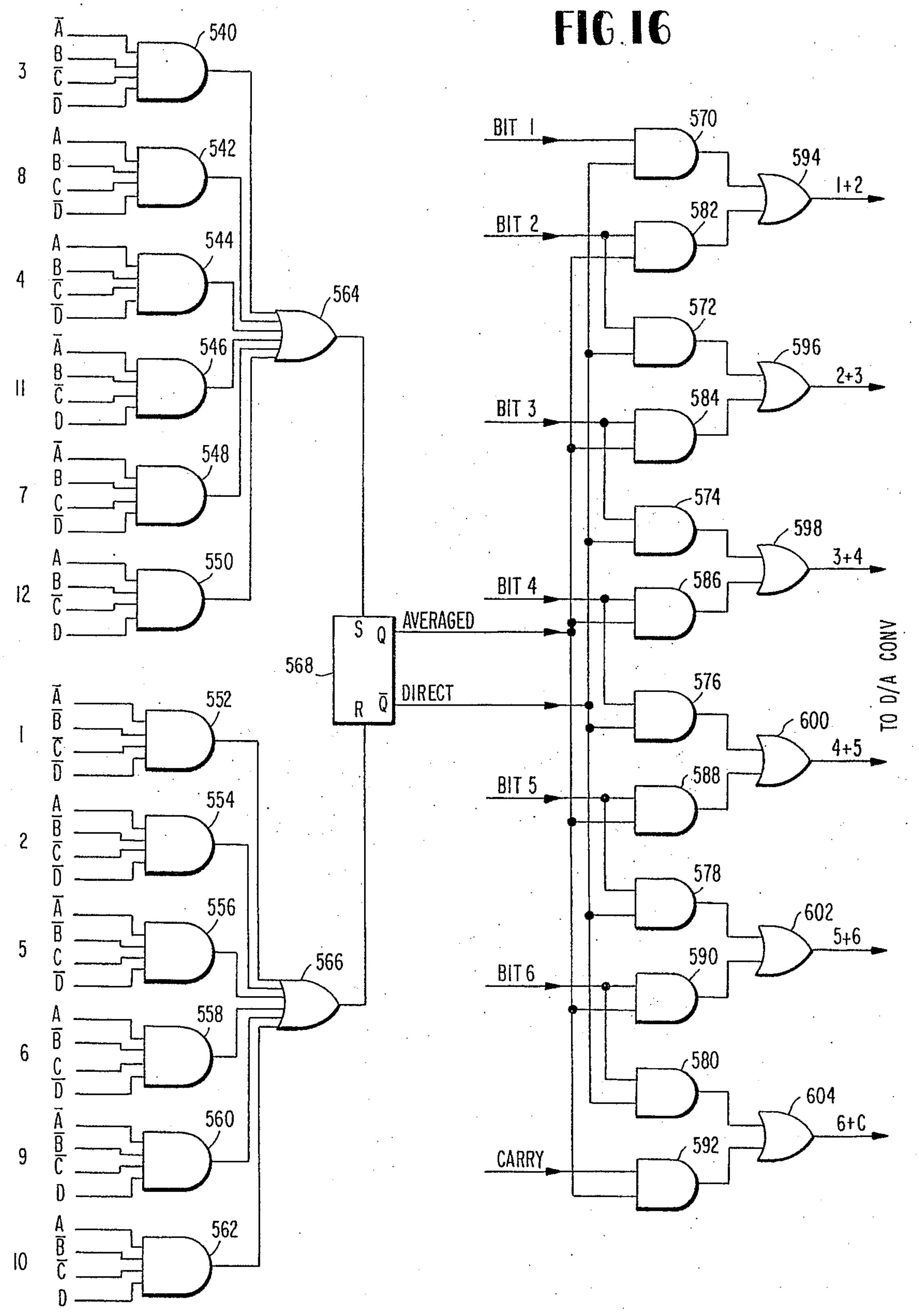
FIG. 16 is a block diagram of the logic for controlling the selection of the adder output lines in the I channel of the receiver.

The logic previously described results in the writing of information into the I submemories in a sequence which repeats every three frames, and a read out sequence which also repeats every three frames. The specific read out sequence is illustrated in Table II above. As will be apparent from the table, during six of the read out times of the 12 line sequence, a pair of lines are read out simultaneously and therefore must be averaged to reconstruct the missing I (or Q) lines. During the other six read out times of the twelve line sequence, a single line is read out and is not added and averaged with any other lines. Consequently, special logic for controlling the averaging operation is provided and an example of that logic circuitry is illustrated in FIGS. 15 and 16. The logic shown is for the adder in the I channel, but the identical logic is applicable to the adder in the Q channel. The adder itself is not shown in FIGS. 15 and 16 but may simply be a conventional six bit binary adder. That is, the binary adder receives a first input word at inputs 1 through 6 and a second input word and inputs 1' through 6'. The output from the adder is six bits plus a carry bit, i.e., 7 output lines. The overall logic for the adder operates as follows: During those times when a single I line is being read out, i.e., no reconstruction of a missing line is taking place, the six bit output words from the I submemory are applied to inputs 1 through 6 of the adder and all zeros are applied to inputs 1' to 6' of the adder. Thus, the selected I line being read out is effectively added to zero. Also, during this time the six output lines 1 through 6 of the adder are gated out to the digital to analog convertor 240 (FIG. 7). The adder input logic, which is connected between the outputs from the I submemories and the regular and primed inputs to the adder, is illustrated in FIG. 15. The logic is shown in detail only for the first and second bits of each 6-bit I word. The logic for bits 1 through 6 is identical and therefore the logic for bits 3 through 6 is not shown.

The gates 500 through 156 are provided for all of the bits in common. The inputs to gates 500 to 510 come from the divide by 12 counter shown in FIG. 14. The inputs are such that at count three, corresponding to read line 3 in Table II above, gate 500 is actuated. At count 4 corresponding to read line 4 in Table II above, gate 504 is actuated. Gate 508 is actuated at count 7, gate 502 is actuated at count 8, gate 506 is actuated at count 11, and gate 510 is actuated at count 12. The outputs from either gates 500 or 502, representing counts 3 and 8, respectively, actuate gate 512 whose output signifies that an I line is simultaneously read out from submemories $I_{01}$ and $I_{02}$ along with $I_{05}$ and $I_{06}$. The numerical labels on the outputs of gates 512, 514 and 516 indicate the I submemories from which data is read. Since each pair of I submemories is read out sequentially, the output designation on the output line of gate 512 means that submemories $I_{01}$ and $I_{05}$ are read out simultaneously followed directly by the simultaneous read out from submemories $I_{02}$ and $I_{06}$. The one bits of each 6 bit word read out memories $I_{01}$ and $I_{02}$ are applied to OR gate 518. The one bits from each submemory $I_{03}$ and $I_{04}$ are applied to OR gate 520. The one bits of each 6 bit word read out of $I_{05}$ and $I_{06}$ are applied to OR gate 522. The logic operates as follows: During the count three, corresponding to read line three of the above table, the output from gate 512 will actuate gates 526 and 532. Thus, the one bits from $I_{01}$ will be applied via gate 538 to the 1' input of the adder simultaneously with the application of the one bits from $I_{05}$ via gate 536 to the 1 input of the adder. Thus, the adder will operate to add each 6 bit word from $I_{01}$ $I_{05}$. Also, as soon as $I_{01}$ and $I_{05}$ are completely read out, the same logic will cause the one bits from $I_{02}$ to be applied via gate 532 to the 1' input of the adder and the one bit from $I_{06}$ to be applied via gate 536 to the 1 input of the adder, thereby adding the six bit outputs from memories $I_{02}$ and $I_{06}$. From the latter description of the logic during count three of the divide by 12 counter, the operation of logic fro the other counts of the divide by 12 counter becomes apparent. Also, as can be seen, the logic for bit two is identical to that for bit one, the only difference being that the bit two outputs are applied to the inputs 2 and 2' of the adder. During counts 1, 2, 5, 6, 9 and 10 of the divide by 12 counter, none of the gates 512, 514 and 516 will be actuated and the logic comprising gates 515, 517, 519 and 521 will direct the one bits from the I memories to the 1 input of the adder. At those times the zeros will be applied to the 1' input of the adder. Similar logic, not shown is provided for the other bits of the output words from the I submemories.

In addition, to controlling the application of the I data words to the proper adder inputs during the 12 counts of the 12 line sequence, logic is also provided for selecting the proper output lines from the adder. The adder has seven output lines which carry respectively, six output bits and a carry bit. During those counts of the divide by 12 counter when the adder receives only a single I line and no reconstruction is taking place, the output logic shown in FIG. 16 selects output lines 1 through 6 of the adder for application to the analog to digital convertor. On the other hand, when the adder is receiving two I lines and is therefore reconstructing a missing I line, the output logic selects lines two through six and the carry bit line resulting in a six bit word applied to the digital to analog convertor. The technique of selecting lines two through six and the carry bit in effect shifts the sum output from the adder one binary position resulting in a divide by two equation. The divide by two operation is necessary because it is desired to average the two input lines and not merely to add them.

The adder output logic comprises gates 540 through 562 which receives their respective inputs from the divide by 12 counter in FIG. 14. During count 1, gate 552 is actuated; during count 2 gate 554 is actuated, etc. The counts during which the respective gates are actuated are indicated by the numerals to the left of gates 540 to 562. Gates 552 through 562 are actuated during counts when only one line is being read out from an I memory and no reconstruction is necessary. The outputs from the latter gates are applied through gate 566 to reset flipflop 568. Gates 540 through 550 are actuated when two lines are being read out from the I submemories and reconstruction of the missing line is taking place. The outputs from gates 540 through gate 550 pass through gate 564 and set flipflop 568. The six bits from the adder output are applied to gates 570 through 592. Bits two through six are each applied to a separate pair of the latter mentioned gates whereas bit one is applied to a single gate and the carry bit is applied to a single gate. When flipflop 568 is in the set condition, indicating that averaging is taking place, the set output from flipflop 568 selects the adder output bits two through six and a carry bit via gates 582, 584, 586, 588, 590 and 592. The latter bits are applied respectively to gates 594 through 608 and then on to the analog to digital convertor. When flipflop 568 is in the reset state, indicating that no averaging is taking place, gates 570 through 580 are selected to pass the adder output bits one through six via respective gates 594 through 608 to the digital to analog convertor.

Referring back to FIG. 7, it will be recalled from the above description that the sync generator 282, which is a conventional device, has a synchronized 14.318 megahertz clock applied thereto. The generator 282, as is conventional, also receives line sync signals and field sync signals. The line sync signals are simply the read start pulses derived from the frame counter by a logic gate shown in FIG. 11. The 60 cycle field sync signal is derived as follows. The read start pulses and the half line start pulses are applied to an OR gate 283. The half line start pulses are also derived from the frame counter by a logic gate shown in FIG. 11. The output pulse rate from OR gate 283 is 31.468 kilocycles per second which is twice the horizontal line rate. The latter pulse stream is applied to a counter 285 which divides the pulse rate by 525, the number of lines per T.V. frame, resulting in an output pulse stream at 60 cps, which is equal to the field rate. Since 525 is an odd number, every odd field is shifted by a half line. This is necessary for conventional interleaved scanning which is assumed for the embodiment described. Synchronization of the 60 cps signal to the vertical sync is accomplished by resetting counter 285 in response to the vertical sync detection from gate 210 at the output of the correlation detector 206.

As will be appreciated by anyone of ordinary skill in the art, there is no video information occurring during the vertical retrace time. That time could be used to transmit other bits. As an example, it would be possible to transmit a conventional PN bit sequence during a portion of the vertical retrace time for the purpose of monitoring the bit error rate of the system.

The system described achieves digital transmission of television signals at a relatively reduced bandwidth due to all of these bit saving techniques incorporated into the system. The vertical and horizontal sync pulses are completely removed from the transmitted data and sync words are serially multiplexed in the output bit stream along with the Y, I, Q and audio data. Although the system is described in connection with a satellite transponder for relaying the signals from transmitter to receiver, it will be apparent that the invention is not limited to use with a satellite transponder or any other transponder. The signals could be transmitted directly to a receiver which is in radio line of sight of the transmitter.

What is claimed is:

1. A digital transmission system for television signals comprising, a. means responsive to a composite video signal for separating said signal into its luminance component, first and second chrominance components, and its vertical and horizontal sync pulses, b. luminance channel processing means responsive to said luminance component for converting every line of said luminance component into digital representations thereof and storing said digital luminance lines, c. first chrominance channel processing means responsive to said first chrominance component for converting the lines of said first chrominance component into digital representations thereof and storing those said digital representations representing every other pair of successive lines of said first chrominance component, d. second chrominance channel processing means responsive to said second chrominance component for converting the lines of said second chrominance component into digital representations thereof and storing those said digital representations representing every other pair of successive lines of said second chrominance component, e. audio channel processing means responsive to an audio signal associated with said composite video signal for digitally converting said audio signal and for storing said digital audio signal, f. a sync word generator means, and g. means responsive to every Nth horizontal sync pulse for actuating said sync word generator and reading out data from said luminance, chrominance and audio channels in a preestablished sequence to provide a multiplexed serial bit stream comprising in a repetitive format of at least one sync word, N digital luminance lines, N/2 digital chrominance lines, and digital audio representing analog audio over an N line duration.

2. A digital transmission system as claimed in claim 1 wherein said luminance channel processing means comprises, a. luminance signal sampling means for pulse amplitude sampling said luminance componate at a sample rate less than the Nyquist rate for said luminance components and equal to an odd multiple of half the horizontal line frequency, b. luminance quantizing means for quantizing said luminance samples into digital luminance samples, c. luminance digital differential PCM means with edge recoding responsive to said digital luminance samples for generating digital respresentations of the difference between successive samples, said digital representations having fewer bits than said digital samples, d. luminance buffer storage means for storing the luminance date outputs from said luminance digital differential PCM means, and e. luminance write control means for writing the output data from said luminance digital differential PCM means into said luminance buffer.

3. A digital transmission system as claimed in claim 2 wherein each of said first and second chrominance channel processing means comprises, a. chrominance signal sampling means for pulse amplitude sampling said chrominance component at sample rates less than the Nyquist rate for said chrominance component and equal to an odd multiplex of half the horizontal line frequency, b. chrominance quantizing means for quantizing said chrominance samples into digital chrominance samples, c. chrominance digital differential PCM means with edge recoding responsive to said digital chrominance samples for generating digital representations of the difference between successive samples, said digital representations having fewer bits than said digital samples, d. chrominance buffer storage means for storing the chrominance data written therein, and e. chrominance write control means for writing every other pair of chrominance output data from said chrominance digital differential PCM into said chrominance buffer storage.

4. A digital transmission system as claimed in claim 3 wherein said means responsive to every Nth horizontal sync pulse comprises, a. transmitter frame counter means adapted to count locally generated output bit rate clock pulses and to be reset by every Nth horizontal sync pulse, b. means responsive to said transmit frame counter for reading out, in nonoverlapping sequence during each cycle of said frame counter, N lines of luminance data from said luminance buffer storage means, N/2 lines of data from the chrominance buffer storage means of said first chrominance channel processing means, N/2 lines of data from the chrominance buffer storage means of said second chrominance channel processing means, and N groups of bits from said audio channel storing means, c. means responsive to a predetermined count in said transmitter frame counter for actuating said sync word generator to generate a group of bits representing a sync word, and d. means for serially combining said sync word, said N groups of audio bits, said N lines of luminance and said N/2 lines of both chrominance components.

5. A digital transmission system as claimed in claim 4 further comprising receiver means adapted to receive data in the same format as appears at the output of said serial combining means for converting said data into composite video and related audio analog signals.

6. A digital transmission system as claimed in claim 5 wherein said receiver means comprises, a. means for detecting said sync words in a received data format and generating sync detect pulses in response thereto, b. receiver frame counter means adapted to count clock pulses at the bit rate of said received data formate and to be reset by said sync detect pulses, c. demultiplexing means responsive to said receiver frame counter for separating the audio, luminance, first chrominance, and second chrominance bits appearing in said received data format from each other, d. receiver luminance channel processing means responsive to said separated out luminance bits for reconverting said luminance bits into an analog luminance component, e. first receiver chrominance channel processing means responsive to said separated out first chrominance bits for reconstructing the missing lines of said first chrominance component and reconverting said chrominance bits and said reconstructed lines into a first analog chrominance component, f. second receiver chrominance channel processing means responsive to said separated out second chrominance bits for reconstructing the missing lines of said second chrominance component and reconverting said chrominance bits and said reconstructed lines into a second analog chrominance component, g. means responsive to said sync detect pulses and said frame counter for reconstructing the horizontal and vertical sync pulses and a chrominance subcarrier frequency for a composite video signal, h. composite color television encoder means responsive to said reconstructed analog luminance and chrominance signals, said vertical and horizontal sync pulses, and said color subcarrier frequency, for forming a composite video signal, and i. receiver audio channel processing means responsive to said separated out audio bits for reconverting said audio bits into an analog audio signal.

* * * * *

UNITED STATES PATENT OFFICE

CERTIFICATE OF CORRECTION

Patent No. 3,795,763 Dated March 5, 1974

Inventor(s) Leonard S. Golding et al

It is certified that error appears in the above-identified patent and that said Letters Patent are hereby corrected as shown below:

In The Specification:

Column 1, line 41 - delete "liminance" and insert -- luminance --

Column 6, line 62 - delete "capacitry" and insert -- capacity --

Column 8, line 63 - delete "cuasing" and insert -- causing --

Column 13, line 18 - after "detector" insert -- . --

Column 20, line 12 - after "$I_{01}$" (first occurrence) inset -- and --

Signed and sealed this 17th day of September 1974.

(SEAL)
Attest:

McCOY M. GIBSON JR.
Attesting Officer

C. MARSHALL DANN
Commissioner of Patents